(12) United States Patent
Saito et al.

(10) Patent No.: US 8,820,908 B2
(45) Date of Patent: *Sep. 2, 2014

(54) INK COMPOSITION, INK SET AND IMAGE FORMING METHOD

(75) Inventors: Ryo Saito, Kanagawa (JP); Yasufumi Ooishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 13/359,499

(22) Filed: Jan. 27, 2012

(65) Prior Publication Data

US 2012/0212536 A1    Aug. 23, 2012

(30) Foreign Application Priority Data

Feb. 17, 2011    (JP) ................................. 2011-032561

(51) Int. Cl.
*B41J 2/01* (2006.01)
*C09D 11/00* (2014.01)
*B41J 2/21* (2006.01)

(52) U.S. Cl.
CPC .............. *C09D 11/40* (2013.01); *B41J 2/2107* (2013.01); *C09D 11/324* (2013.01); *C09D 11/54* (2013.01)
USPC ............................................ 347/100; 347/95

(58) Field of Classification Search
CPC ........ C09D 11/36; C09D 11/40; C09D 11/30; C09D 11/38; C09D 11/322; C09D 11/328; C09D 11/101; B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21
USPC ................. 347/100, 95, 96, 101, 102, 88, 99; 106/31.6, 31.27, 31.13; 523/160, 161
See application file for complete search history.

(56) References Cited

U.S. PATENT DOCUMENTS

| | | | |
|---|---|---|---|
| 2004/0011247 A1* | 1/2004 | Taguchi | 347/100 |
| 2006/0098067 A1* | 5/2006 | Imai et al. | 347/100 |
| 2006/0103704 A1* | 5/2006 | Hakamada et al. | 347/100 |
| 2007/0030306 A1 | 2/2007 | Okamura et al. | |
| 2007/0247492 A1* | 10/2007 | Mori | 347/45 |
| 2008/0017066 A1 | 1/2008 | Bauer et al. | |
| 2009/0322842 A1 | 12/2009 | Kosydar et al. | |
| 2010/0041816 A1* | 2/2010 | Ikoshi et al. | 106/31.6 |
| 2010/0166962 A1 | 7/2010 | Ohzeki | |
| 2011/0193912 A1* | 8/2011 | Sakai et al. | 347/20 |
| 2011/0212261 A1 | 9/2011 | Okamura et al. | |

FOREIGN PATENT DOCUMENTS

| | | |
|---|---|---|
| EP | 2270109 A | 1/2011 |
| EP | 2412766 A | 2/2012 |
| JP | 4-356570 A | 12/1992 |
| JP | 3000853 B | 1/2000 |
| JP | 2004-285344 A | 10/2004 |
| JP | 2007-169314 A | 7/2007 |
| JP | 2008-544852 | 12/2008 |
| JP | 2009-144007 A | 7/2009 |
| JP | 2010-065205 | 3/2010 |

OTHER PUBLICATIONS

English language translation of the following: Office action dated Apr. 23, 2013 from the JPO in Japanese patent application corresponding to the instant patent application. This office action translation is submitted now in order to supplement the understanding of patent doctument JP2010-065205 and JP2008-544852 which are cited in the office action and are being disclosed in the instant Information Disclosure Statement.

Japanese Office Action dated Mar. 11, 2014 issued in corresponding Japanese Patent Application.

* cited by examiner

Primary Examiner — Manish S Shah

(74) Attorney, Agent, or Firm — SOLARIS Intellectual Property Group, PLLC

(57) ABSTRACT

An ink composition is disclosed which includes carbon black; at least one selected from the group consisting of a cyan pigment and a magenta pigment; at least one selected from the group consisting of polyvinyl pyrrolidone, polyvinyl alcohol, and polyethylene glycol, at a ratio of 0.01% by mass or higher but lower than 1.00% by mass, relative to the total amount of the composition; water-insoluble or substantially water-insoluble resin particles, water-insoluble or substantially water-insoluble wax particles or any mixture thereof; and water. An ink set and an image forming method are also disclosed.

15 Claims, No Drawings

INK COMPOSITION, INK SET AND IMAGE FORMING METHOD

CROSS-REFERENCE TO RELATED APPLICATION

This application is based on and claims priority under 35 USC 119 from Japanese Patent Application No. 2011-032561 filed on Feb. 17, 2011, the disclosure of which is incorporated herein by reference.

BACKGROUND OF THE INVENTION

1. Technical Field

The present invention relates to an ink composition, an ink set, and an image forming method.

2. Description of the Related Art

Recording methods utilizing inkjet methods allow recording of high-quality images on various recording media by ejecting droplets of inks from a number of nozzle holes provided at an inkjet head. Therefore, recording methods utilizing inkjet methods are widely used.

Pigments are widely used as a coloring material, which is one of the components contained in an ink.

Among the pigments used in inks, carbon black is widely used as a black pigment.

Further, a technique in which a pigment other than carbon black, such as a cyan pigment, is used together with carbon black (hereinafter, may be abbreviated to "CB") is also known.

Specifically, for example, a pigment-dispersed aqueous recording liquid containing carbon black (CB) and a pigment other than CB, such as a cyan pigment, together with a urethane resin has been disclosed (see, for example, Japanese Patent Application Laid-Open (JP-A) No. 2004-285344). Further, an aqueous ink for inkjet recording which contains polymer particles containing carbon black has been disclosed (see, for example, JP-A No. 2009-144007).

However, pigment inks containing a pigment may thicken and gradually solidify, due to evaporation of solvent components in the inks. When pigment inks solidify, it is hard to dissolve the ink again afterwards. Thus, when such a thickened or solidified ink adheres to a nozzle tip portion of an inkjet head or the like and is gradually deposited thereon, the nozzle holes may become narrower or clogging may be caused, which leads to problems such as deviation in the ejection direction of the ink or non-ejection. When the adhered ink is readily deposited, it is difficult to maintain the performance by means of using a nozzle cap, a wiping unit, or the like, and as a result, image formability deteriorates over time.

In connection with the above, methods using a liquid for washing off adhered inks have been proposed and, for example, a maintenance liquid for inkjet recording containing a resin-dissolving solvent which is insoluble or slightly soluble in water and a moisturizing agent has been disclosed (see, for example, JP-A No. 2007-169314). It is said that when such a maintenance liquid is used, defects such as unstable ejection, clogging of nozzles, or the like are less likely to occur.

Further, in inks including a pigment, a dispersant for dispersing the pigment is generally used, and polyvinyl pyrrolidone is known as the dispersant. For example, an ink for aqueous recording which contains polyvinyl pyrrolidone as a polymer dispersant together with a pigment, a resin emulsion, and the like has been disclosed (see, for example, JP-A No. 4-356570 and Japanese Patent No. 3000853).

SUMMARY OF THE INVENTION

However, in an ink composition containing carbon black, at least one of a cyan pigment or a magenta pigment, and a polymer component such as resin particles or wax, there are cases in which the cyan color or the magenta color separates from the original black color over time. Hereinbelow, this phenomenon may be referred to as "color separation over time" or simply as "color separation".

Further, in a composition including a polymer component such as resin particles or wax in an ink, for the purpose of, for example, improvement of rub resistance of the formed image or prevention of peeling, solidification or deposition of ink occurs particularly easily. For this reason, it is not sufficient to achieve removal only by a conventional technique such as applying a maintenance liquid containing a resin-dissolving solvent or a moisturizing agent or wiping (hereinbelow, this operation may be simply referred to as "maintenance"), and ink may deposit on nozzles over time, resulting in frequent occurrence of non-ejection from nozzles or ejection deviation when ejection is restarted after temporary suspension of ejection.

Furthermore, in a case in which carbon black is incorporated in the above composition, since carbon blacks include hard particles, when maintenance is repeatedly performed, a surface of an ink head or a non-wetting layer (for example, a fluorine-containing organic liquid repellent material layer), which may be provided on a surface of an ink head, may be damaged, resulting in increased occurrence of non-ejection from nozzles or ejection deviation.

On the other hand, an ink containing polyvinyl pyrrolidone as a pigment dispersant tends to have a higher content of polyvinyl pyrrolidone.

However, in a composition containing a polymer component such as resin particles or wax, in a case in which the content of polyvinyl pyrrolidone is high, the liquid viscosity of the ink increases and clogging of nozzles tends to occur more easily. As the ink thickens, the amount of ink deposited increases over time, as a result of which non-ejection or ejection deviation is likely to occur when ejection is restarted after temporary suspension of ejection or when ejection is restarted after repeatedly performing maintenance.

The present invention has been made in view of the above problems and aims to accomplish the following. Namely, an aspect of the invention is to provide an ink composition which contains carbon black, at least one of a cyan pigment or a magenta pigment, and a polymer component, and with which color separation over time is suppressed, and further, non-ejection and ejection deviation are suppressed when ejection is restarted after temporary suspension of ejection or when ejection is restarted after repeatedly performing maintenance, and an ink set, and further provides an image forming method with which image defects such as image voids are suppressed and high resolution images can be stably formed over a long period of time.

According to a first aspect of the present invention, an ink composition is provided which includes carbon black; at least one selected from the group consisting of a cyan pigment and a magenta pigment; at least one selected from the group consisting of polyvinyl pyrrolidone, polyvinyl alcohol, and polyethylene glycol, at a ratio of 0.01% by mass or higher but lower than 1.00% by mass, relative to the total amount of the composition; water-insoluble or substantially water-insoluble resin particles, water-insoluble or substantially water-insoluble wax particles, or any mixture thereof; and water.

According to a second aspect of the present invention, an ink set is provided, which includes: the ink composition of the first aspect; and a treatment liquid including an aggregating component that forms an aggregate when contacted with the ink composition which includes the ink composition of the first aspect; and a treatment liquid including an aggregating component capable of causing formation of an aggregate when contacting with the ink composition.

According to a third aspect of the present invention, an image forming method is provided which includes: ejecting the ink composition of the first aspect or the ink composition included in the ink set of the second aspect onto a recording medium by an inkjet method from an ejection head which is provided with a plurality of nozzle holes that eject liquid droplets, each of the nozzle holes comprising an internal surface that comprises a film containing a silicon atom.

According to the present invention, an ink composition which contains carbon black, at least one of a cyan pigment or a magenta pigment, and a polymer component, and with which color separation over time is suppressed, and further, non-ejection and deviation of ink droplet ejection direction are suppressed when ejection is restarted after temporary suspension of ejection or when ejection is restarted after repeatedly performing maintenance, and an ink set may be provided.

Further, according to the present invention, an image forming method with which image defects such as image voids are suppressed and high resolution images are stably formed over a long period of time may be provided.

DETAILED DESCRIPTION OF THE INVENTION

Hereinbelow, an ink composition and an ink set of the present invention, and an image forming method using the same are described in detail.

<Ink Composition and Ink Set>

The ink composition of the present invention (hereinbelow, may also be referred to as the "ink") contains carbon black; at least one selected from the group consisting of a cyan pigment and a magenta pigment; at least one selected from the group consisting of polyvinyl pyrrolidone, polyvinyl alcohol, and polyethylene glycol, at a ratio of 0.01% by mass or higher but lower than 1.00% by mass, relative to the total amount of the composition; water-insoluble or substantially water-insoluble resin particles, water-insoluble or substantially water-insoluble wax particles, or any mixture thereof; and water.

The ink composition of the present invention may further contain one or more other components, as necessary.

In general, for example, there are cases in which at least one of a cyan pigment or a magenta pigment is added, as a pigment, to a black ink composition, in addition to carbon black (CB) that is a black pigment, from the viewpoints of improvement in color tone, improvement in color reproducibility, and the like.

However, an ink composition containing carbon black, at least one of a cyan pigment or a magenta pigment, and a polymer component such as resin particles or wax may cause over time color separation, that is a phenomenon in which at least one of a cyan color or a magenta color separates from the original black color over time.

The present inventors have found that the over time color separation can be suppressed by adding at least one of polyvinyl pyrrolidone (hereinbelow, may be abbreviated to PVP), polyvinyl alcohol (hereinbelow, may be abbreviated to PVA), or polyethylene glycol (hereinbelow, may be abbreviated to PEG) in a relatively small amount to an ink composition containing carbon black, at least one of a cyan pigment or a magenta pigment, and a polymer component, and have accomplished the present invention.

Namely, with the ink composition having the above configuration of the invention, the suppression of color separation over time can be achieved.

In general, in an image forming method in which ink droplets are spotted onto a recording face by an inkjet method, ink is likely to adhere to the vicinity of ejection holes (for example, nozzle holes arranged on a nozzle plate) at the time of ink ejection, and the adhered ink is likely to become a fixed substance. In particular, in the case of using a liquid composition prepared by adding, to an aqueous ink liquid containing a pigment, at least one type of water-insoluble or substantially water-insoluble resin particles or water-insoluble or substantially water-insoluble wax particles (hereinbelow, may be referred to as "resin particles or the like"), the amount of adhered and solidified substances is greater and the adhered and solidified substances tend to grow faster as compared with the case of not containing the resin particles or the like, due to precipitation and deposition of the resin particles or wax particles in the ink liquid. Therefore, when image formation is continued while repeating ejection of an ink liquid and temporary suspension of ejection, fixed substances may grow and may make the nozzle holes narrower over time, thereby causing ejection deviation in which the ejected ink droplets are spotted on a position different from the expected position, and further, causing clogging of nozzles, which leads to a phenomenon in which non-ejection occurs.

In the present invention, by the inclusion of at least one of polyvinyl pyrrolidone (hereinbelow, may be abbreviated to PVP), polyvinyl alcohol (hereinbelow, may be abbreviated to PVA), or polyethylene glycol (hereinbelow, may be abbreviated to PEG) in a relatively small amount, deposition of fixed substances of the ink in the vicinity of nozzle holes is less likely to occur, and even when the ink is adhered, it becomes easier to remove the adhered ink by wiping or the like. The reason is guessed as follows. Namely, the PVP or the like adsorbs to the surface of the ejection head in the vicinity of the nozzle holes (surface of the outside of holes; for example, a plate face of a nozzle plate) or the surface (wall face) of the inner wall of the ink channel inside the holes, and thus, it is guessed that due to the adsorption of PVP or the like, the adsorption sites of the plate face or the hole inner wall face to which resin particles or wax particles may adsorb are reduced.

By having such a configuration as described above, when image formation is performed while repeating ejection of an ink liquid and temporary suspension of ejection, ejection deviation and non-ejection of ink can be prevented, and image defects such as image voids can be suppressed, and as a result, high resolution images can be stably formed over a long period of time.

Further, since the ink is hardly solidified in the adhered state, and the adhered ink is less likely to grow to become a solidified substance, the ink exhibits excellent maintenance properties.

Furthermore, in general, in the case of using an ink containing carbon black and the resin particles or the like, since carbon blacks include hard particles, when maintenance is repeatedly performed, the surface of an ink head (surface of the side at which the holes are provided) or a non-wetting layer (for example, a fluorine-containing organic liquid-repellent material layer), which may be provided on the surface of an ink head, may be deteriorated, resulting in being readily to occur non-ejection from nozzles or ejection deviation.

In connection to this, since the ink composition of the present invention contains at least one of PVP, PVA, or PEG, the sticking and deposition of ink at the ink head can be prevented, and excellent maintenance properties can be provided and, as a result, non-ejection from nozzles and ejection deviation after repeatedly performing maintenance can be suppressed. Further, since the ink composition of the present invention contains at least one of PVP, PVA, or PEG, the liquid repellency of ink at the surface of a non-wetting layer can be enhanced, and thus, the amount of the adhered ink or maintenance residue may be reduced, which enables decreasing of the frequency of maintenance activities. Moreover, deterioration of the surface of the non-wetting layer which is caused by being in contact with ink over a long period of time may also be suppressed.

As a result, by using the ink composition of the present invention, durability of the non-wetting layer which may be provided on the surface of an ink head can be improved.

For the non-wetting layer which may be provided on a surface of an ink head (surface of the side at which the holes are provided), for example, a fluorine-containing organic liquid-repellent material layer is used, as described above.

More specifically, an example of the non-wetting layer is a layer formed by using a molecule having a carbon chain in which one end is closed by a —$CF_3$ group and the other end is closed by a —$SiCl_3$ group, as described in paragraph 0028 of Japanese National Phase Publication No. 2008-544852. Here, the "molecule having a carbon chain in which one end is closed by a —$CF_3$ group and the other end is closed by a —$SiCl_3$ group" is preferably a molecule having a fluorocarbon chain, and more preferably at least one of tridecafluoro-1,1,2,2-tetrahydrooctyltrichlorosilane (FOTS) or 1H,1H,2H,2H-perfluorodecyltrichlorosilane (FDTS).

In the present invention, the at least one of PVP, PVA, or PEG is used at a relatively small amount at a predetermined ratio relative to the entire ink composition, and has a function of suppressing adhesion and solidification of ink, as well as has a function of suppressing over long period of time color separation of coloring materials in the case of using plural pigment species in combination.

(Carbon Black)

Examples of the carbon black in the present invention include a carbon black produced by a known method such as a contact method, a furnace method, or a thermal method. Specific examples thereof include furnace black, thermal lamp black, acetylene black, and channel black.

Specific examples of carbon blacks may include, but are not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, and RAVEN 700 (all trade names, manufactured by Columbian Chemicals Company), REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300, and MONARCH 1400 (all trade names, manufactured by Cabot Corporation), COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all trade names, manufactured by Evonik-Degussa GmbH), and No. 25, No. 33, No. 40, No. 45, No. 47, No. 52, No. 900, No. 2200B, No. 2300, MCF-88, MA600, MA7, MA8, and MA100 (all trade names, manufactured by Mitsubishi Chemical Corporation).

One type of the carbon blacks described above may be incorporated in the ink composition, or two or more types of them may be incorporated in the ink composition.

The content of carbon black in the ink composition of the present invention is preferably in a range of from 0.5% by mass to 5.0% by mass, and more preferably in a range of from 1.0% by mass to 3.0% by mass, with respect to the total solids content of the ink composition.

When the content of carbon black is 0.5% by mass or higher with respect to the total solids content of the ink composition, a desired black density may be readily maintained. Further, when the content of carbon black is 5.0% by mass or lower with respect to the total solids content of the ink composition, generation of scratches on the nozzle surface at the time of maintenance can further be suppressed, and when the content of carbon black is 3.0% by mass or lower with respect to the total solids content of the ink composition, abrasion of nozzle ports due to ejection over a long period of time can be reduced.

Further, the carbon black is preferably incorporated in the ink composition in the form of a self-dispersible pigment described below, or in the form of a resin-coated pigment described below. In this case, the preferable range of the content of the carbon black as a self-dispersible pigment or a resin-coated pigment is also the same as described above.

(Cyan Pigment)

Examples of the cyan pigment according to the present invention include C. I. Pigment Blue 1, 2, 3, 15, 15:1, 15:2, 15:3, 15:34, 16, 17:1, 22, 25, 56, and 60, and C. I. Vat Blue 4, 60, and 63. (Copper) phthalocyanine pigments are preferable, and C. I. Pigment Blue 15:3 is particularly preferable.

One type of the cyan pigments may be incorporated alone in the ink composition, or two or more types of them may be incorporated in the ink composition.

(Magenta Pigment)

Examples of the magenta pigment according to the present invention include C. I. Pigment Red 48, 57, 122, 184, 188, and 202, C. I. Violet 19, and solid solutions thereof. A quinacridone pigment and a solid solution thereof are preferable, and C. I. Pigment Red 122 and C. I. Pigment Violet 19 are particularly preferable.

One type of the magenta pigments may be incorporated alone in the ink composition, or two or more types of them may be incorporated in the ink composition.

The content of at least one of a cyan pigment or a magenta pigment in the ink composition of the present invention is preferably in the following range.

Namely, in the case of a cyan pigment, the content is preferably in a range of from 1% by mass to 50% by mass with respect to the total mass of the carbon black. From the viewpoint of suppressing the change in hue when a one color ink image whose brightness is varied is printed, the content is more preferably in a range of from 5% by mass to 40% by mass.

Further, in the case of a magenta pigment, the content is preferably in a range of from 1% by mass to 70% by mass with respect to the total mass of the carbon black. From the viewpoint of suppressing the change in hue when a one color ink image whose brightness is varied is printed, the content is more preferably in a range of from 5% by mass to 60% by mass.

From the viewpoints of reduction of streaks or unevenness in an image, it is preferable that the ink composition of the present invention contains a cyan pigment and a magenta pigment. In this case, a preferable content is the same as the preferable content described above.

Moreover, the cyan pigment or the magenta pigment is preferably incorporated in the ink composition in the form of a self-dispersible pigment described below or in the form of a resin-coated pigment described below. In this case, a preferable range of the content of the cyan pigment or the magenta pigment as a self-dispersible pigment or a resin-coated pigment is also the same as the preferable range described above.

(Additional Pigment)

The ink composition of the present invention may contain one or more other pigments (additional pigment(s)) other than those described above, as necessary. The additional pigment may be an organic pigment or an inorganic pigment.

Examples of the organic pigment include an azo pigment, a disazo pigment, an azo lake pigment, a quinacridone pigment, a perylene pigment, an anthraquinone pigment, a polycyclic pigment, a dye chelate, a nitro pigment, a nitroso pigment, and aniline black.

Examples of the inorganic pigment include titanium oxide, iron oxide, calcium carbonate, barium sulfate, aluminum hydroxide, barium yellow, cadmium red, and chrome yellow.

(Self-dispersible Pigment or Resin-Coated Pigment)

In the present invention, it is preferable that each of at least one of the carbon black, the cyan pigment, or the magenta pigment (more preferably, all of the carbon black, the cyan pigment, and the magenta pigment) is a self-dispersible pigment, or at least a part of a surface of each of at least one of the carbon black, the cyan pigment, or the magenta pigment (more preferably, at least a part of a surface of each of the carbon black, the cyan pigment, and the magenta pigment) is coated with a water-insoluble resin. The pigment (the carbon black, the cyan pigment, or the magenta pigment) in which at least a part of a surface thereof is coated with a water-insoluble resin is also referred to as the "resin-coated pigment" in this specification. Since both the self-dispersible pigment and the resin-coated pigment have self-dispersibility, these pigments can be dispersed in an ink composition without using a pigment dispersant.

In the present invention, by using the self-dispersible pigment or the resin-coated pigment, the phenomenon in which at least one of PVP, PVA, or PEG incorporated in the ink composition is consumed as a pigment dispersant is suppressed.

Therefore, with the use of the self-dispersible pigment or the resin-coated pigment, the various effects owing to the at least one of PVP, PVA, or PEG, such as suppression of color separation, suppression of non-ejection, suppression of ejection deviation, and the like, are more effectively realized.

—Self-Dispersible Pigment—

The self-dispersible pigment is a pigment which is treated so as to have, on the pigment surface, one or two or more functional groups (dispersibility imparting groups) selected from the group consisting of —COOH, —CHO, —OH, —SO$_3$H, and salts thereof, and is a pigment which can be uniformly dispersed in an aqueous ink composition without using a separate dispersant. The term "being dispersed" as used herein refers to a state in which the self-dispersible pigment is stably present in water without using a dispersant, and encompasses not only a state of being dispersed but also a state of being dissolved.

In the ink composition containing the self-dispersible pigment, the PVP, PVA, or PEG to be incorporated, which are described below, does not contribute to the dispersion of the pigment, effectively works for the prevention of non-ejection and ejection deviation, as well as has a high dispersibility. Further, since the viscosity of the ink composition becomes adequate by the inclusion of the PVP, PVA, or PEG, it is possible to add a larger amount of pigments. Accordingly, high resolution images with excellent color densities may be stably formed over a long period of time.

Regarding the preparation method of self-dispersible pigments, self-dispersible pigments can be obtained through allowing a functional group or a molecule containing a functional group to chemically bond, for example, coordinate, graft, or the like, to a surface of a pigment, or the like, in accordance with a physical treatment such as a vacuum plasma treatment, or a chemical treatment. For example, self-dispersible pigments can be obtained by the method described in JP-A No. 8-3498.

Further, commercially available products of self-dispersible pigments can be also utilized. Preferable examples thereof include MICROJET series (trade name), manufactured by Orient Chemical Industries, Ltd. and CAB-O-JET series (trade name), manufactured by Cabot Corporation.

The self-dispersible pigment is preferably a self-dispersible pigment that has a carboxyl group (—COOH) on the surface of the pigment, from the viewpoint of improvement in both the ink aggregation property and rub resistance, by a reaction with an aggregation component in the case of using the treatment liquid described below.

The average particle diameter of the self-dispersible pigment is preferably from 10 nm to 300 nm, and more preferably from 40 nm to 150 nm, from the viewpoints of improvement in storage stability of the ink and prevention of nozzle clogging.

The content of the self-dispersible pigment in the ink composition is preferably from 1% by mass to 15% by mass from the viewpoint of obtaining a high density and from the viewpoint of the liquid stability of the ink composition, and more preferably from 2% by mass to 10% by mass from the viewpoint of enhancing the ejection stability.

In the present invention, a pigment to which an anionic polymer is covalently bonded is preferably used as the self-dispersible pigment, and when such a pigment is used, continuous ejection property (ejection property during continuous ejection) of the ink may be improved. The pigment to which an anionic polymer is covalently bonded has at least one type of anionic polymer and a pigment, in which the anionic polymer is covalently bonded to the pigment. The pigment to which an anionic polymer is covalently bonded (hereinbelow, may also be referred to as the "anionic polymer-bonded type pigment" or "polymer-modified pigment") is a pigment capable of being dispersed in an aqueous medium, that is included in the ink, without using an additional dispersant.

The pigment may be a carbon product or the like which is to be oxidized by the use of an oxidant for introducing, onto the surface thereof, an ionic group and/or a group capable of being ionized. An oxidized pigment prepared in such a manner has a group containing a higher degree of oxygen on the surface thereof.

Examples of the oxidant include, but are not limited to, an oxygen gas; ozone; peroxides such as hydrogen peroxide; sodium peroxosulfate, and peroxosulfate containing potassium; hypohalogenite such as sodium hypochlorite; oxidizing acids such as nitric acid; sodium perchlorate; nitrogen oxides including NO$_2$; oxidants containing a transition metal such as permanganate, osmium tetraoxide, or chromium oxide; and eerie ammonium nitrate. Mixtures of oxidants, specifically, mixtures of oxidants in the form of gas, such as oxygen and ozone, or the like may also be used. In order to introduce an ionic group or a group capable of being ionized, a modified pigment that uses a surface modifying method such as sulfonylation may also be used.

The carbon black as the self-dispersible pigment may be a multi-phase aggregate including a carbon phase and a silicon-containing species phase, or a multi-phase aggregate including a carbon phase and a metal-containing species phase. When the silicon-containing species and/or the metal-containing species are considered to be a phase included in an aggregate as the carbon phase, the multi-phase aggregate including a carbon phase and a silicon-containing species phase can be considered to be a silicon treated carbon black aggregate, and the multi-phase aggregate including a carbon phase and a metal-containing species phase can be considered to be a metal-treated carbon black aggregate. The multi-phase aggregates does not include a mixture of discrete carbon black aggregates and discrete silica or metal aggregates in its scope. Rather, the multi-phase aggregates that can be used as carbon black include at least one silicon-containing or metal-containing region concentrated on or near the surface of the aggregate (but it is placed on the aggregate) and/or inside the aggregate. Accordingly, the aggregate includes at least two phases, one of which is carbon and the other of which is a silicon-containing species, a metal-containing species, or both. The silicon-containing species, which can be a part of the aggregate, is not bonded to a carbon black aggregate like a silane coupling agent does, but is actually a part of the same aggregate as the carbon phase.

The metal-treated carbon black is an aggregate including at least a carbon phase and a metal-containing species phase. The metal-containing species include a compound containing aluminum, zinc, magnesium, calcium, titanium, vanadium, cobalt, nickel, zirconium, tin, antimony, chromium, neodymium, lead, tellurium, barium, cesium, iron, or molybdenum. The metal-containing species phase can be dispersed in at least a part of the aggregate, and is a part intrinsic to the aggregate. The metal-treated carbon black may include more than one metal-containing species phase. The metal-treated carbon black may include a silicon-containing species phase and/or a boron-containing species phase.

Details on the production of these multi-phase aggregates are explained in U.S. Pat. Nos. 5,830,930, 5,877,238, and 6,028,127, International Publication WO 96/37547, and U.S. Pat. Nos. 6,017,980, 5,904,762 and 6,057,387.

A silica-coated carbon product can also be used as the pigment, which is described in WO96/37547. Further, any pigment(s) coated with silica may be used. For such coated pigment, a coupling agent having a functional group capable of reacting with the coating film, silica, or the metal phase may be used in order to impart a necessary or desired functionality to the pigment, as in the case of the above described metal-treated carbon black or multi-phase aggregate.

The value of the BET surface area as measured by nitrogen absorption may vary according to the desired characteristics of the pigment and the pigment may have a BET surface area in a wide range. For example, the BET surface area of the carbon black pigment may be from about 10 $m^2/g$ to about 2,000 $m^2/g$, from about 10 $m^2/g$ to about 1,000 $m^2/g$, or from about 50 $m^2/g$ to about 500 $m^2/g$. It is known to those skilled in the art that when the particle structure is the same, a larger surface area corresponds to a smaller particle size. A larger surface area is preferred, and in the case of not capable of being used for desired application immediately, the pigment may be subjected to a conventional size reducing or pulverizing technique such as a milling medium, jet milling, microfluidization, or an ultrasonic treatment, as necessary, for reducing the particle size of the pigment to a smaller particle size.

The carbon black may have a structure of from about 10 mL/100 g to about 1,000 mL/100 g, or a structure of from about 40 mL/100 g to about 200 mL/100 g.

In the anionic polymer-bonded type pigment, at least one type of an anionic group or a group capable of becoming an anionic form is bonded to at least one type of polymer that is bonded to the pigment. The term "a group capable of becoming an anionic form" used herein means a group capable of being ionized so as to be anionic. For example, the anionic group or the group capable of becoming an anionic form can be an acidic group or a salt of an acidic group. The acidic group can be a derivative of an organic acid such as a carboxyl group, a hydroxyl group, a sulfonic acid group, a sulfuric acid group, or a phosphonic acid group. The anionic group or the group capable of becoming an anionic form can provide a functional group that has relation to an aggregation reaction between a fixing agent liquid and an anionic polymer-bonded type pigment, on a recording medium surface.

The polymer included in the anionic polymer-bonded type pigment is not particularly limited, and examples thereof may include polystyrene, a styrene/acrylic copolymer, a styrene/acrylic ester copolymer, polyacrylic ester, polymethacrylic ester, polyethyl acrylate, a styrene/butadiene copolymer, a butadiene copolymer, polyurethane, an acrylonitrile/butadiene copolymer, a chloroprene copolymer, a crosslinked acrylic resin, a crosslinked styrene resin, vinylidene fluoride, a benzoguanamine resin, a polyethylene resin, a polypropylene resin, a styrene/methacrylic ester copolymer, a styrene/acrylamide copolymer, n-isobutyl acrylate, n-butyl acrylate, vinyl acetate, acrylamide, polyvinyl acetal, a rosin resin, a vinylidene chloride resin, an ethylene/vinyl acetate copolymer, a vinyl acetate/acrylic copolymer, and a vinyl chloride resin. The polymer can be carried on the pigment in an amount of from about 20% to about 30% of the mass of the anionic polymer-bonded type pigment.

The polymer-modified pigment may be prepared, from the modified pigment described below, by a process including polymerizing at least one kind of polymerizable monomer. The polymer groups may be polymer groups of various different types including, for example, a homopolymer, a random copolymer, a block copolymer, a graft copolymer, a branched copolymer, or an alternating copolymer.

In general, there are three types of methods which can be used for preparing a pigment having at least one kind of polymer group bonded thereto. These methods are called "onto grafting", "through grafting", and "from grafting" processes. The "from grafting" process generally includes polymerization of a monomer in the presence of a modified pigment having at least one kind of polymerizable group bonded thereto. The bonded polymer can sterically prevent the arrival of the growing polymer chain to the polymerizable group on the surface of the pigment, and thus, the existence of the bonded polymer can restrict further bonding. It should be noted that, the "from grafting" process typically includes generating an initiation point on the pigment surface, and directly polymerizing a monomer from the initiation point.

It is preferable that the polymer-modified pigment is prepared by the "from grafting" process. Any of the "from grafting" processes which are known in this technical field may be used. For example, the polymer-modified pigment may be prepared by a process of polymerization "from" a pigment which has at least one kind of transferable atom or group and to which at least one kind of polymerizable monomer is bonded. Alternatively, a conventional radical polymerization may be used, in which at least one kind of polymerizable monomer is polymerized "from" a pigment having an initiating group bonded thereto. Preferably, the polymer-modified pigment is prepared by using a polymerization process including polymerizing at least one kind of polymerizable monomer from the pigment having at least one kind of transferable atom or group bonded thereto. Examples of such polymerization process include atom transfer radical polymerization (ATRP), stable free radical (SFR) polymerization, and reversible addition fragmentation chain transfer (RAFT) polymerization, as well as ionic polymerization such as group transfer polymerization (GTP). In the polymerization, typically, but not necessarily, a breeding chain terminal with a relatively low fixed concentration may be involved in relation with a chain terminal in a state of cessation. In a case in which the chain is in a state of cessation, the chain terminal contains a transferable atom or group. The chain terminal in the state of cessation may be converted to a modified chain terminal by losing the transferable atom or group.

ATRP, SFR, and RAFT are living radical polymerization methods which are used for preparing a polymer material from a radical-polymerizable monomer using an initiator containing a radical-transferable atom or group. In these polymerization methods, the type of transferring group is different from each other. For example, ATRP polymerization typically involves transfer of a halogen group. Details regarding the ATRP process are described, for example, in ACS Symposium Series 768, and Handbook of Radical Polymerization (K. Matyjaszewski, T. P. Davis (Editors): Wiley-Interscience, Hoboken 2002), as well as Journal of the American Chemical Society 1995, 117, 5614, written by Matyjaszewski. SFR polymerization generally involves transfer of a stable free radical group such as a nitroxyl group. Details regarding nitroxide-mediated polymerization are described, for example, in Chapter 10 of Handbook of Radical Polymerization (K. Matyjaszewski, T. P. Davis (Editors): Wiley-Interscience, Hoboken 2002). For example, although many other groups are shown in Accounts of Chemical Research 2004, 37(5), 312-325 (C. L. McCormick and A. B. Lowe), the group that transfers is, for example, a thiocarbonylthio group, in the RAFT process described in Macromolecules 1998, 31(16), 5559 (Chiefari, et. al.). From this point of view, the RAFT process is different from the nitroxide-mediated polymerization. When compared with these processes, GTP is a polymerization technique of polymerizing an anionic or cationic polymerizable monomer from an initiator containing an ionically transferable atom or group such as a silyl group (for example, a trimethylsilyl group). Details regarding the GTP process are described, for example, in Journal of the American Chemical Society 1983, 105(17), 5706-5708 (Webster, et. al.) and in Encyclopedia of Polymer Science and Engineering 1987, 7, 580-588 (Webster).

—Resin-Coated Pigment—

In the resin-coated pigment described above, it is not necessary that the entire surface of the pigment particle is coated, and the pigment may be in a state in which at least a part of the particle surface is coated. By having such a form, the pigment particles can exist in the form of particles having very small particle diameters, and a high dispersion stability may be obtained after dispersion. Accordingly, high resolution images having excellent color density may be stably formed over a long period of time.

Preferable examples of the water-insoluble resin include [1] a polymer containing a repeating unit (a) represented by Formula (1) described below and a repeating unit (b) having an ionic group; and [2] a polymer containing a constituent unit derived from a salt forming group-containing monomer (c) and a constituent unit derived from a styrenic macromonomer (d) and/or a hydrophobic monomer (e). Among them, the [1] polymer is preferable. For the details of the polymer [2], details described in paragraphs 0012 to 0031 of JP-A No. 2009-84501 can be referred to.

Here, the term "water-insoluble" means that, when a polymer is mixed with an aqueous medium at 25° C., the amount of the polymer that dissolves in the aqueous medium is 10% by mass or less, expressed as the mass ratio relative to the total polymer mixed with the aqueous medium.

Hereinbelow, the [1] polymer containing a repeating unit (a) represented by Formula (1) and a repeating unit (b) having an ionic group is specifically described.

This polymer contains at least one type of repeating unit represented by the following Formula (1) and at least one type of repeating unit having an ionic group, and may further contain, as necessary, one or more other structural units such as another hydrophobic repeating unit (additional hydrophobic repeating unit) other than the repeating unit represented by Formula (1) or a hydrophilic repeating unit having a nonionic functional group.

<Repeating Unit (a) Represented by Formula (1)>

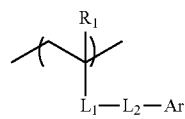

Formula (1)

In Formula (1), $R_1$ represents a hydrogen atom, a methyl group, or a halogen atom (for example, a chlorine atom, a bromine atom, an iodine atom, or the like); $L_1$ represents *—COO—, *—OCO—, *—CONR$_2$—, *—O—, or a substituted or unsubstituted phenylene group; and $R_2$ represents a hydrogen atom or an alkyl group having from 1 to 10 carbon atoms. Herein, the "*" sign in the groups represented by $L_1$ represents a bonding site to bond to the main chain. $L_2$ represents a single bond or a divalent linking group. Ar represents a monovalent group derived from an aromatic ring.

In Formula (1) above, $R_1$ represents a hydrogen atom, a methyl group, or a halogen atom, and preferably represents a methyl group.

$L_1$ represents *—COO—, *—OCO—, *—CONR$_2$—, *—O—, or a substituted or unsubstituted phenylene group. In a case in which $L_1$ represents a phenylene group, the phenylene group is preferably an unsubstituted phenylene group. $R_2$ represents a hydrogen atom or an alkyl group having from 1 to 10 carbon atoms.

$L_2$ represents a single bond or a divalent linking group. The divalent linking group is preferably a linking group having from 1 to 30 carbon atoms, an imino group (—NH—), a sulfamoyl group, more preferably a linking group having from 1 to 25 carbon atoms, even more preferably a linking group having from 1 to 20 carbon atoms, and particularly preferably a linking group having from 1 to 15 carbon atoms.

Above all, the most preferable examples include an alkyleneoxy group having from 1 to 25 carbon atoms (more preferably, having from 1 to 10 carbon atoms), a divalent linking group containing an alkylene group such as an alkylene group having from 1 to 20 carbon atoms (more preferably, having from 1 to 15 carbon atoms) or an ethylene oxide group [—(CH$_2$CH$_2$O)$_n$—, n=1 to 6], a group obtained by combining two or more types of linking groups selected from the above, and the like.

Ar represents a monovalent group derived from an aromatic ring.

The aromatic ring of the monovalent group represented by Ar is not particularly limited, and examples thereof include a benzene ring, a condensed aromatic ring having 8 or more carbon atoms, and a heterocycle-condensed aromatic ring.

The term "condensed aromatic ring having 8 or more carbon atoms" described above refers to an aromatic compound having 8 or more carbon atoms, in which two or more benzene rings are condensed with each other, or an aromatic compound having 8 or more carbon atoms, in which an alicyclic hydrocarbon is condensed with at least one type of aromatic ring. Specific examples include naphthalene, anthracene, fluorene, phenathrene, and acenaphthene.

The term "a heterocycle-condensed aromatic ring" described above refers to a compound in which a heteroatom-containing cyclic compound is condensed with an aromatic compound that does not contain a heteroatom (preferably, a benzene ring). Here, the heteroatom-containing cyclic compound is preferably a 5-membered ring or a 6-membered ring. The heteroatom is preferably a nitrogen atom, an oxygen atom, or a sulfur atom. The heteroatom-containing cyclic compound may have plural heteroatoms. In this case, the heteroatoms may be the same as or different from each other.

Specific examples of the heterocycle-condensed aromatic ring include phthalimide, acridone, carbazole, benzoxazole, and benzothiazole.

Specific examples of a monomer that forms the repeating unit represented by Formula (1) above may include vinyl monomers such as (meth)acrylates, (meth)acrylamides, styrenes, or vinyl esters.

In the present invention, the hydrophobic structural unit having an aromatic ring, which is bonded to an atom in the main chain through a linking group, has a structure in which the aromatic ring is bonded to an atom in the main chain of the water-insoluble resin through a linking group, and does not directly bond to an atom in the main chain of the water-insoluble resin. Therefore, a suitable distance is maintained between the hydrophobic aromatic ring and the hydrophilic structural unit, and thus, an interaction between the water-insoluble resin and the pigment is likely to be generated, resulting in achieving strong adsorption to further improve the dispersibility.

Furthermore, specific examples of the monomer that forms the repeating unit represented by Formula (1) above may include the following monomers. However, it should be construed that the present invention is not limited to these specific examples.

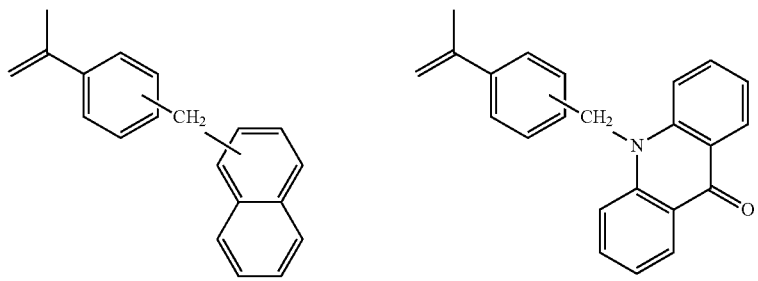

M-25/M-27 (m- or p-position substitution products)

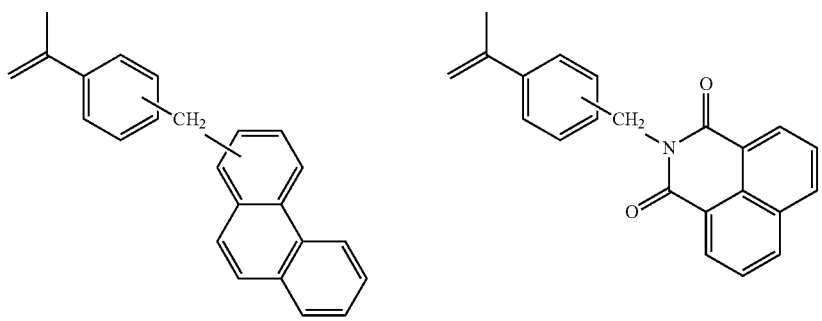

M-28/M-29 (m- or p-position substitution products)

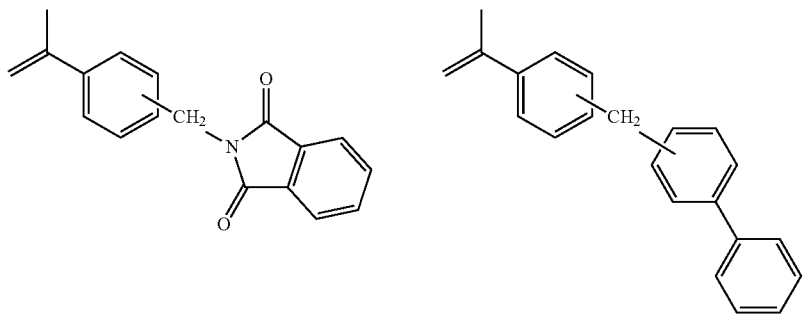

15
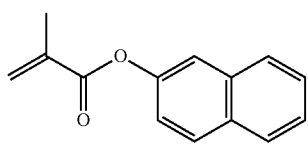 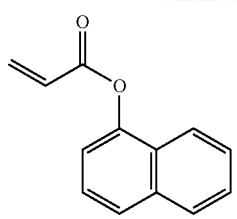
16
-continued
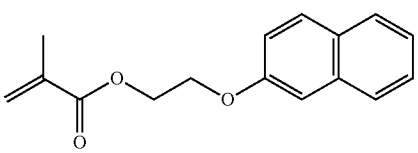
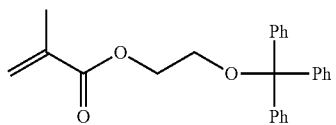 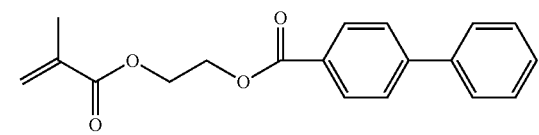
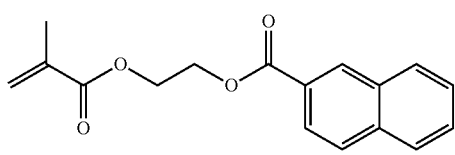 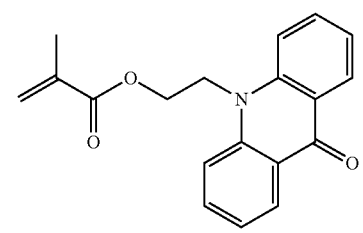
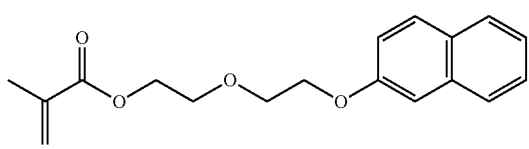 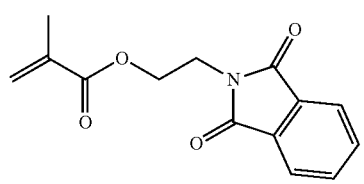
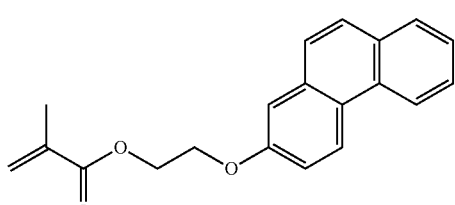 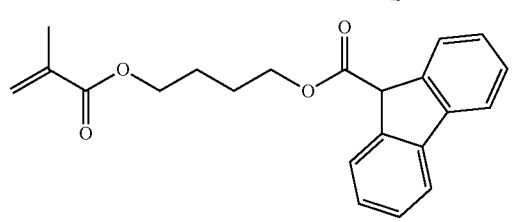
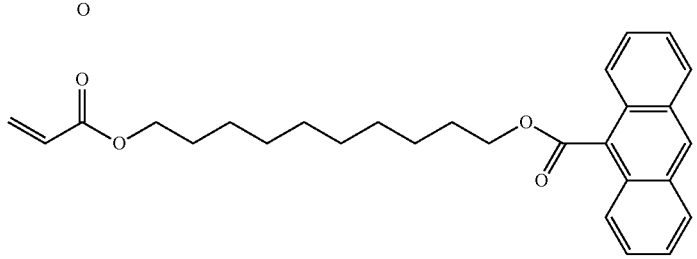
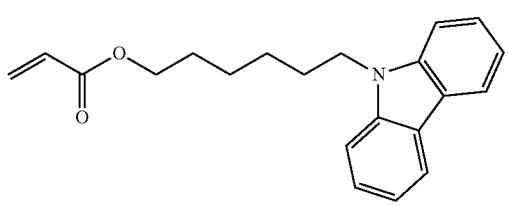
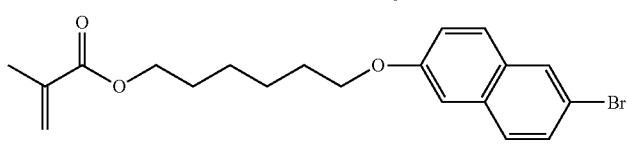 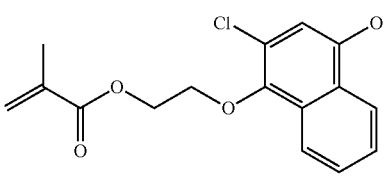
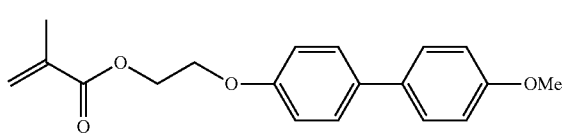

-continued

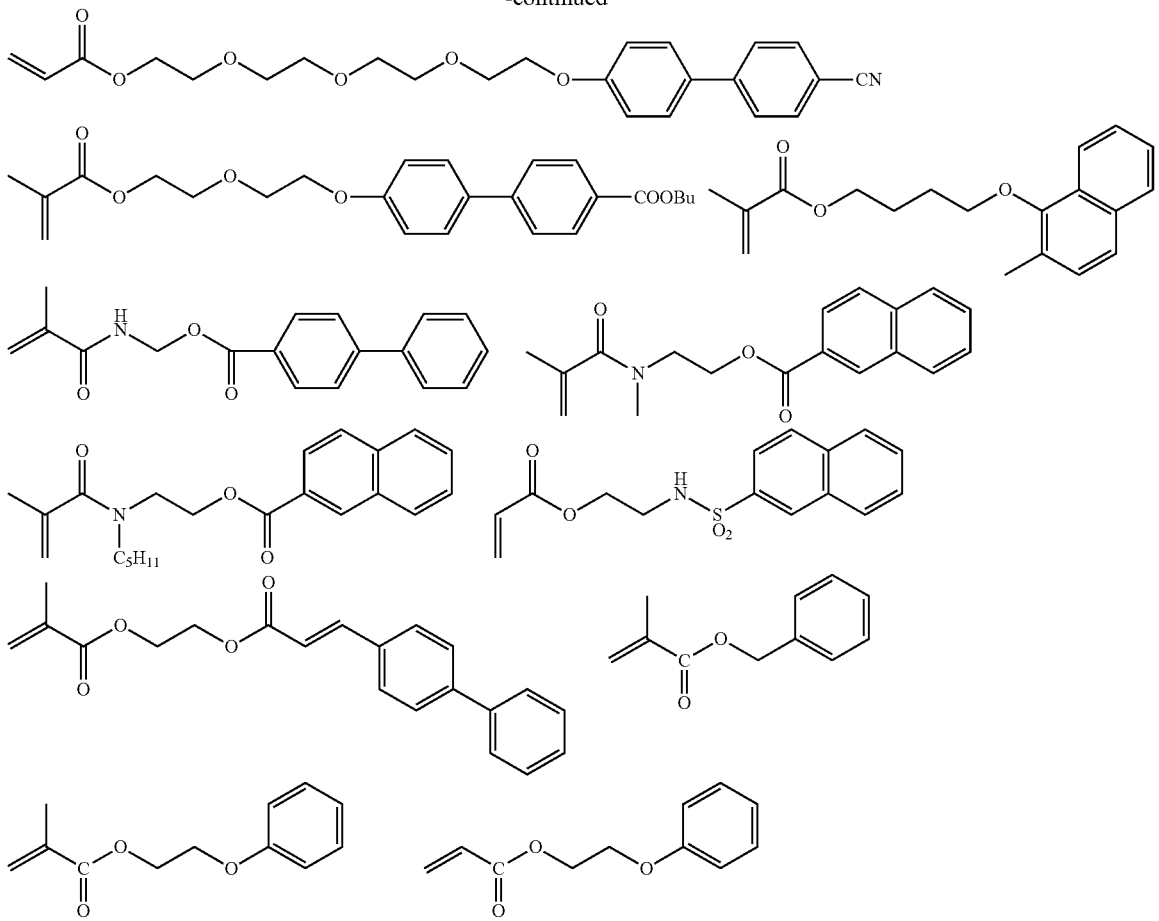

Ar in the repeating unit (a) represented by Formula (1) above is preferably a monovalent group derived from benzyl (meth)acrylate, phenoxyethyl acrylate, phenoxyethyl methacrylate, acridone, or phthalimide, from the viewpoint of the dispersion stability of the coated pigment.

One type of the repeating units may be used alone, or two or more types of them may be used by mixing them.

The content ratio of the repeating unit represented by Formula (1) above in the polymer is preferably in a range of from 5% by mass to 25% by mass, and more preferably in a range of from 10% by mass to 18% by mass, with respect to the total mass of the polymer. When the content ratio is 5% by mass or higher, generation of image defects such as white spots or the like may be remarkably suppressed, and when the content ratio is 25% by mass or lower, problems in production suitability which may be caused by the decrease in solubility of the polymer in a polymerization reaction solution (for example, methyl ethyl ketone) may hardly arise, which is preferable.

<Additional Hydrophobic Repeating Unit>

The polymer [1] may further include, as a hydrophobic structural unit, one or more other hydrophobic repeating units (additional hydrophobic repeating unit) other than the repeating unit represented by Formula (1) above. Examples of the additional hydrophobic repeating unit may include a structural unit derived from a vinyl monomer such as (meth)acrylates, (meth)acrylamides, styrenes, or vinyl esters, each of which is not a hydrophilic structural unit (for example, each of which does not have a hydrophilic functional group), and a structural unit derived from a hydrophobic structural unit having an aromatic ring which is bonded to an atom in the main chain through a linking group. One type of these structural units may be used alone, or two or more types of them may be used by mixing them.

Examples of the (meth)acrylates include alkly (meth)acrylates such as methyl (meth)acrylate, ethyl (meth)acrylate, butyl (meth)acrylate, isobutyl (meth)acrylate, or hexyl (meth) acrylate. In particular, an alkyl(meth)acrylate having an alkyl moiety having from 1 to 4 carbon atoms is preferable. Specifically, methyl (meth)acrylate, ethyl (meth)acrylate, and butyl (meth)acrylate are preferable, and methyl (meth)acrylate and ethyl (meth)acrylate are particularly preferable.

Examples of the (meth)acrylamides include N-cyclohexyl (meth)acrylamide, N-(2-methoxyethyl) (meth)acrylamide, N,N-diallyl(meth)acrylamide, and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group (for example, t-Boc (ter-butoxycarbonyl) or the like) capable of being eliminated by an acidic substance, methyl vinylbenzoate, α-methylstyrene, and vinylnaphthalene. Among these, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

<Repeating Unit (b) Having Ionic Group>

Examples of the repeating unit having an ionic group include repeating units derived from a monomer having an ionic group such as a carboxyl group, a sulfo group, or a phosphonate group. Specific examples may include vinyl monomers having an ionic functional group, such as (meth) acrylic acid, (meth)acrylates, (meth)acrylamides, or vinyl esters. The repeating unit having an ionic group may be introduced into the polymer, for example, by polymerization of the corresponding monomer, or introduction of an ionic group into the polymer chain after polymerization.

Among the above repeating units having an ionic group, a repeating unit derived from acrylic acid or methacrylic acid is preferable. Polymer [1] preferably contains a structural unit derived from acrylic acid or a structural unit derived from methacrylic acid, or both.

It is preferable that the content of the repeating unit (b) having an ionic group in the polymer [1] is 15% by mass or lower with respect to the total mass of the polymer, and that the polymer [1] contains at least a structural unit derived from (meth)acrylic acid as the repeating unit having an ionic group.

When the content of the repeating unit (b) having an ionic group is 15% by mass or lower with respect to the total mass of the polymer, excellent dispersion stability may be realized. In particular, the content of the repeating unit (b) having an ionic group is preferably from 5% by mass to 15% by mass, and more preferably from 7% by mass to 13% by mass, from the viewpoint of dispersion stability.

The polymer [1] can stably exist in an aqueous ink composition, and has excellent properties in terms, for example, of suppression of adhesion of aggregates or deposition of aggregates onto an inkjet head or the like, and of the removability of adhered aggregates. From these viewpoints, the polymer [1] may further have a hydrophobic structural unit other than the repeating unit (a) represented by Formula (1) and another hydrophilic structural unit (additional hydrophilic structural unit) other than the "repeating unit (b) having an ionic group".

<Hydrophilic Repeating Unit>

The additional hydrophilic structural unit may be, for example, a repeating unit derived from a monomer having a nonionic hydrophilic group. Examples thereof may include vinyl monomers having a hydrophilic functional group, such as (meth)acrylates having a hydrophilic functional group, (meth)acrylamides having a hydrophilic functional group, or vinyl esters having a hydrophilic functional group.

Examples of the "hydrophilic functional group" include a hydroxyl group, an amino group, an amido group (in which the nitrogen atom is unsubstituted), and an alkylene oxide such as polyethylene oxide, polypropylene oxide, or the like, which are described below.

The monomer that forms a hydrophilic repeating unit having a nonionic hydrophilic group is not particularly limited as long as the monomer has a functional group capable of forming a polymer, such as an ethylenically unsaturated bond, and a nonionic hydrophilic functional group. The monomer that forms a hydrophilic repeating unit having a nonionic hydrophilic group can be selected as appropriate from known monomers. Preferable examples thereof may include, specifically, hydroxyethyl (meth)acrylate, hydroxybutyl (meth) acrylate, (meth)acrylamide, aminoethyl acrylate, aminopropyl acrylate, and a (meth)acrylate that contains an alkylene oxide polymer.

The hydrophilic repeating unit having a nonionic hydrophilic group may be formed by polymerization of a corresponding monomer or introduction of a nonionic hydrophilic functional group into the polymer chain after polymerization.

The hydrophilic repeating unit having a nonionic hydrophilic group is more preferably a hydrophilic structural unit having an alkylene oxide structure. The alkylene moiety of the alkylene oxide structure is preferably an alkylene having from 1 to 6 carbon atoms, more preferably an alkylene having from 2 to 6 carbon atoms, and particularly preferably an alkylene having from 2 to 4 carbon atoms, from the viewpoint of hydrophilicity. Further, the polymerization degree of the alkylene oxide structure is preferably from 1 to 120, more preferably from 1 to 60, and particularly preferably from 1 to 30.

It is also preferable that the hydrophilic repeating unit having a nonionic hydrophilic group is a hydrophilic repeating unit containing a hydroxyl group. The number of hydroxyl groups in the repeating unit is not particularly limited, and is preferably from 1 to 4, more preferably from 1 to 3, and particularly preferably from 1 to 2, from the viewpoints of the hydrophilicity of the water-insoluble resin and mutual compatibility with the solvent or other monomers at the time of polymerization.

In polymer [1], the composition of the hydrophilic repeating units and the hydrophobic repeating units (including the repeating unit represented by Formula (1) above) depends on the degrees of the hydrophilicity and hydrophobicity of these components. It is preferable that the content of the hydrophilic repeating units in polymer [1] is 15% by mass or lower. Here, the content of the hydrophobic repeating units is preferably higher than 80% by mass, and more preferably 85% by mass or higher, with respect to the total mass of the water-insoluble resin.

When the content of the hydrophilic repeating units is 15% by mass or lower, the amount of components which singly dissolves in an aqueous medium is decreased, which results in the improvement in various properties in terms of pigment dispersion and the like, whereby a satisfactory ink ejection property is achieved at the time of inkjet recording.

The content ratio of the hydrophilic repeating units relative to the total mass of the water-insoluble resin is preferably in a range of higher than 0% by mass but 15% by mass or lower, more preferably in a range of from 2% by mass to 15% by mass, even more preferably from 5% by mass to 15% by mass, and particularly preferably from 8% by mass to 12% by mass.

The content ratio of aromatic rings contained in the water-insoluble resin, relative to the total mass of the water-insoluble resin, is preferably 27% by mass or lower, more preferably 25% by mass or lower, and even more preferably 20% by mass or lower. In particular, the content ratio of the aromatic rings is preferably in a range of from 15% by mass to 20% by mass, and more preferably in a range of from 17% by mass to 20% by mass. When the content ratio of the aromatic rings is within the above range, rub resistance may be improved.

Specific examples of polymer [1] (molar ratio (% by mass), weight average molecular weight Mw, acid value) include those described below. However, the present invention is not limited to the specific examples.

Phenoxyethyl acrylate/methyl methacrylate/acrylic acid copolymer (50/45/5)

Phenoxyethyl acrylate/benzyl methacrylate/isobutyl methacrylate/methacrylic acid copolymer (30/35/29/6)

Phenoxyethyl methacrylate/isobutyl methacrylate/methacrylic acid copolymer (50/44/6)

Phenoxyethyl acrylate/methyl methacrylate/ethyl acrylate/acrylic acid copolymer (30/55/10/5)

Benzyl methacrylate/methyl methacrylate/methacrylic acid copolymer (60/30/10)

(M-25/M-27) mixture/ethyl methacrylate/methacrylic acid copolymer (molar ratio: 15/75/10, MW: 49,400, acid value: 65.2 mgKOH/g)

(M-25)/ethyl methacrylate/methacrylic acid copolymer (molar ratio: 18/69/13, MW: 41,600, acid value: 84.7 mgKOH/g)

(M-28/M-29) mixture/ethyl methacrylate/methacrylic acid copolymer (molar ratio: 15/85/10, MW: 38,600, acid value: 65.2 mgKOH/g)

(M-28)/ethyl methacrylate/methacrylic acid copolymer (molar ratio: 20/73/7, MW: 45,300, acid value: 45.6 mgKOH/g)

The acid value of the water-insoluble resin in the present invention is preferably from 30 mgKOH/g to 100 mgKOH/g, more preferably from 30 mgKOH/g to 85 mgKOH/g, and particularly preferably from 50 mgKOH/g to 85 mgKOH/g, from the viewpoints of pigment dispersibility and storage stability.

The acid value as used herein is defined as the mass (mg) of KOH necessary for completely neutralizing 1 g of the water-insoluble resin, and measured by the method described in JIS Standards (JIS K0070, 1992), the disclosure of which is incorporated by reference herein.

The molecular weight of the water-insoluble resin in the present invention, in terms of weight average molecular weight (Mw), is preferably 30,000 or more, more preferably from 30,000 to 150,000, even more preferably from 30,000 to 100,000, and particularly preferably from 30,000 to 80,000. When the molecular weight is 30,000 or more, the water-insoluble resin tends to provide a good steric repulsion effect as a dispersant, and is readily adsorbed on the pigment owing to the steric effect.

The number average molecular weight (Mn) of the water-insoluble resin is preferably in a range of from about 1,000 to about 100,000, and particularly preferably in a range of from about 3,000 to about 50,000. When the number average molecular weight is within the above described range, the water-insoluble resin may exert a function as a coating film for a pigment or a function as a coating film for an ink composition. It is preferable that the polymer [1] is used in the form of an alkali metal salt or an organic amine salt.

The molecular weight distribution (weight average molecular weight/number average molecular weight) of the water-insoluble resin is preferably in a range of from 1 to 6, and more preferably in a range of from 1 to 4. When the molecular weight distribution is within the above range, the resulting ink has improved dispersion stability and ejection stability.

The number average molecular weight and the weight average molecular weight are measured by gel permeation chromatography (GPC). For the GPC, HLC-8020 GPC (trade name, manufactured by Tosoh Corporation) is used, and three pieces of TSK GEL SUPER MULTIPORE HZ-H (trade name, manufactured by Tosoh Corporation; 4.6 mm ID×15 cm) are used as columns. Further, THF (tetrahydrofuran) is used as an eluent, and detection is performed using THF as the solvent. The molecular weight is determined in terms of polystyrene used as a reference material.

The water-insoluble resin may be synthesized by any polymerization method, for example, solution polymerization, precipitation polymerization, suspension polymerization, precipitation polymerization, bulk polymerization, or emulsion polymerization. The polymerization reaction may be carried out using a known procedure such as in a batch manner, a semi-continuous manner, or a continuous manner. The method of initiating polymerization may be, for example, a method using a radical initiator, a method of irradiating light or a radiation, or the like. The methods of polymerization and the methods of initiation of polymerization are described in, for example, "Kobunshi Gosei Hoho (Polymer Synthesis Method)" written by Teiji Tsuruta, revised edition (published by Nikkan Kogyo Shimbun, Ltd., 1971) and "Kobunshi Gosei no Jikkenho (Experimental Technique of Polymer Science)" written by Takayuki Ohtu and Masaetu Kinoshita (published by Kagaku-Dojin Publishing Company Inc., 1972), pages 124 to 154.

Among these polymerization methods, a solution polymerization method using a radical initiator is particularly preferable. Examples of a solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in a combination of two or more of them. Alternatively, the solvent may be mixed with water as a mixed solution. The polymerization temperature should be chosen in consideration of the molecular weight of the polymer to be produced, the kind of initiator, or the like. The polymerization temperature is usually from about 0° C. to about 100° C., and it is preferable that the polymerization is carried out at a temperature within a range of from 50° C. to 100° C. The reaction pressure may be selected as appropriate, and is usually from 1 kg/cm$^2$ to 100 kg/cm$^2$, and particularly preferably from about 1 kg/cm$^2$ to about 30 kg/cm$^2$. The reaction time may be from about 5 hours to about 30 hours. The resulting resin may be subjected to purification such as reprecipitation.

In a case in which the pigment in the present invention is a resin-coated particle obtained by coating a pigment particle with a water-insoluble resin, the pigment is preferably in the form of a pigment coated with a water-insoluble resin by a phase inversion emulsification method, from the viewpoint of dispersion stability.

Basically, the phase inversion emulsification method is a self-dispersion (phase inversion emulsification) method including dispersing in water a mixed melt of a pigment and a resin having self-dispersibility or solubility. The mixed melt may contain a curing agent or a polymer compound. The scope of the mixed melt as used herein encompasses a state in which the components thereof are only mixed with each other without dissolving in each other, a state in which the components thereof are mixed with each other and dissolved in each other, and a state in which both of these states are present. An example of a specific production method by a "phase inversion emulsification method" is a method described in JP-A No. 10-140065.

Examples of specific production methods involving a phase inversion emulsification method and an acid precipitation method include methods described in JP-A Nos. 9-151342 and 10-140065.

The resin-coated pigment may be suitably obtained through a preparation process of preparing a dispersion of a resin-coated pigment by using a water-insoluble resin in accordance with a method including the following process (1) and process (2). Further, the ink composition can be prepared by a method of forming an aqueous ink by using a dispersion of a resin-coated pigment obtained in the preparation process, together with water and an organic solvent.

Process (1): a process of dispersing a mixture containing a water-insoluble resin, an organic solvent, a neutralizing agent, a pigment, and water, with a stirrer or the like, to obtain a dispersion.

Process (2): a process of removing the organic solvent from the dispersion.

The stirring method is not particularly limited, and a generally-used mixing stirrer or, if necessary, a disperser such as an ultrasonic disperser, a high-pressure homogenizer, or a bead mill may be used.

Preferable examples of the organic solvent include alcohol solvents, ketone solvents, and ether solvents. The details thereof are described in the item of resin particles described below. The neutralizing agent is used for neutralizing some or all of the dissociative groups so as to allow the water-insoluble resin to get into a stably emulsified or dispersed state in water. The details of the neutralizing agent are described below.

In the process (2), the organic solvent is evaporated from the dispersion obtained through the process (1) by a common method such as distillation under reduced pressure to convert the phase into an aqueous system, thereby obtaining a dispersion of resin-coated pigment particles in which the surfaces of the pigment particles are coated with the water-insoluble resin. The obtained dispersion is substantially free from the organic solvent. The amount of residual organic solvent is preferably 0.2% by mass or less, and more preferably 0.1% by mass or less. More specifically, the method includes, for example: (1) a process of mixing a copolymer having an anionic group or a solution obtained by dissolving the water-insoluble resin in an organic solvent, with a basic compound (neutralizing agent), thereby carrying out neutralization; (2) a process of mixing the resulting mixed liquid with a pigment to produce a suspension, and then dispersing the pigment by using a disperser or the like to obtain a pigment dispersion liquid; and (3) a process of removing the organic solvent by distillation or the like, thereby coating the pigment with the water-insoluble resin having an anionic group, and dispersing the pigment in an aqueous medium to obtain an aqueous dispersion.

More specifically, the descriptions in JP-A Nos. 11-209672 and 11-172180 may be referred to.

In the present invention, the dispersion treatment may be carried out by using, for example, a ball mill, a roll mill, a bead mill, a high-pressure homogenizer, a high-speed stirring type disperser, an ultrasonic homogenizer, or the like.

The total amount (on the basis of mass) of the self-dispersible pigment and/or the resin-coated pigments in which at least a part of the surfaces of the pigment particles is coated with the water-insoluble resin in the ink composition is as described above.

(PVP, PVA, or PEG)

The ink composition of the present invention contains at least one selected from the group consisting of polyvinyl pyrrolidone (PVP), polyvinyl alcohol (PVA), and polyethylene glycol (PEG). By the inclusion of the PVP or the like, in a case in which an ink composition containing at least one type of resin particles or wax particles, which are described below, is prepared and used, deposition of fixed substances of ink in the vicinity of nozzle holes may be less likely to occur, and even when ink is adhered, removing by wiping or the like may becomes easier. Therefore, in a usage form in which the ink composition is used while repeating ejection of ink and temporary suspension of ejection, ejection deviation and non-ejection of ink may be prevented, and as a result, ink ejection properties and further, properties in terms of formation of desired high resolution images may become stable.

In the invention, the total content of the at least one of PVP, PVA, or PEG is 0.01% by mass or higher but lower than 1.00% by mass, with respect to the total mass of the ink composition. By the inclusion of the PVP or the like in such a relatively small amount, the ink ejection property and image formability can be improved without increasing the viscosity of the ink.

In other words, when the content ratio of the PVP or the like is lower than 0.01% by mass of the total mass of the ink composition, the addition amount is too small and thus, the separation and deposition of resin particles or wax particles cannot be prevented. When the content ratio of the PVP or the like is 1.00% by mass or higher of the total mass of the ink composition, the addition amount is too large, the ink is likely to adhere, and the ink thickens which leads to the occurrence of non-ejection or image voids in the image.

In particular, from the viewpoint of prevention of ejection deviation and non-ejection of ink when ejection is restarted after temporary suspension of ejection or after repeatedly performing maintenance (specifically, from the viewpoints of prevention of image voids and improvement in droplet deposition position accuracy), the content ratio of the PVP or the like is preferably from 0.01% by mass to 0.5% by mass, more preferably from 0.05% by mass to 0.5% by mass, even more preferably from 0.05% by mass to 0.2% by mass, and particularly preferably from 0.05% by mass to 0.1% by mass, with respect to the total mass of the ink composition.

The PVA in the present invention includes modified polyvinyl alcohols which are modified with various groups such as an acetoacetyl group, a carboxyl group, an anionic group such as a hydroxyl group, or a silanol group in its scope.

(Wax Particles or Resin Particles)

The ink composition of the present invention contains at least one type selected from the group consisting of water-insoluble or substantially water-insoluble wax particles and water-insoluble or substantially water-insoluble resin particles.

In a case in which the ink composition contains at least one type selected from the group consisting of water-insoluble or substantially water-insoluble wax particles and water-insoluble or substantially water-insoluble resin particles, adhesion and deposition of ink readily occur. Therefore, in this case, the effects of prevention of ink ejection deviation or non-ejection due to the inclusion of the PVP or the like may be realized effectively.

—Wax Particles—

The ink composition of the present invention can contain at least one type of wax particles described above. In this case, the rub resistance of the image may further be improved.

Here, the term "water-insoluble or substantially water-insoluble" wax particles as used above refers to wax particles whose dissolution amount is 10 g or less, when the wax particles are dried at 105° C. for 2 hours, and then dissolved in 100 g of water at 25° C. From the viewpoint of improving the continuous ejection property and ejection stability of the ink, the dissolution amount is preferably 5 g or less, and more preferably 1 g or less.

Examples of the wax may include natural wax and synthetic wax.

Examples of the natural wax include petroleum-derived waxes, vegetable-derived waxes, and vegetable and animal derived waxes.

Examples of the petroleum-derived waxes may include paraffin wax, microcrystalline wax, and petrolatum. Examples of the vegetable-derived waxes may include carnauba wax, candelilla wax, rice wax, and Japan tallow. Examples of the vegetable and animal derived waxes may include lanolin and beeswax.

Examples of the synthetic wax include synthetic hydrocarbon waxes and modified waxes.

Examples of the synthetic hydrocarbon waxes include polyethylene waxes and Fisher-Tropsch waxes. Examples of the modified waxes may include paraffin wax derivatives, montan wax derivatives, microcrystalline wax derivatives, and the like, and derivatives thereof.

Among the above waxes, carnauba wax is preferable from the viewpoint of improvement in rub resistance of the image, and also from the viewpoint of improvement in image strength in the post-processing (processing for producing a booklet or the like) of image samples. Further, paraffin wax and derivatives thereof, which include hydrocarbon having from 20 to 40 carbon atoms as the main component, are preferable from the viewpoints of being excellent in image gloss, prevention of moisture vaporization from the nozzle tip, and moisture retention effect.

Further, polyethylene wax exhibits good compatibility with a resin, and therefore, polyethylene wax is preferable in view of ease of forming uniform and good images. Furthermore, polyethylene wax may be easily modified, and glycol-modified polyethylene wax obtained by modifying the polyethylene wax is more preferable, since wettability originating from glycol can be given, and therefore, wettability effects of the ink composition can be demonstrated at the nozzle tip and ejection stability may be made more effectively.

It is preferable to use wax together with an emulsifying and dispersing agent. The emulsifying and dispersing agent may be used by selecting from among numerous emulsifying and dispersing agents conventionally known to those skilled in the art. The emulsifying and dispersing agent is preferably a nonionic surfactant having a low molecular weight (preferably having a weight average molecular weight of from 100 to 5,000), and particularly preferably a dispersant represented by Formula (W) described below. In a case in which wax is used as an emulsified dispersion, it is guessed that the dispersion system is likely to become unstable and separation or deposition of ink readily occurs, when such a nonionic surfactant having a low molecular weight is mixed in the ink and exists together with a pigment or resin particles. In such a case, the effects of the present invention (prevention of ejection deviation and non-ejection of ink) may be more strongly demonstrated.

Note that, the weight average molecular weight is a molecular weight as measured by gel permeation chromatography (GPC) and is expressed in terms of polystyrene.

$$(R^3)_a\text{-}G\text{-}(D)_d \quad \text{Formula (W)}$$

In Formula (W), $R^3$ represents a substituted or unsubstituted, straight chain, branched, or cyclic alkyl group, alkenyl group, aralkyl group, or a substituted or unsubstituted aryl group, each of which has from 10 to 60 carbon atoms. Preferable examples of the group represented by $R^3$ include $C_gH_{2g+1}$ (wherein g represents an integer of from 12 to 60), eicosyl, and docosanyl.

G represents a linking group having a valency of from 2 to 7 or a single bond, preferably a divalent or trivalent linking group or a single bond, and more preferably an alkylene group, an arylene group, or a composite group thereof, which may be a divalent linking group that is interposed with oxygen, an ester group, an amido group, or the like.

D represents a polyoxyalkylene group of $(B)_n\text{-}E$, wherein B represents $-CH_2CH_2O-$, $-CH_2CH_2CH_2O-$, $-CH(CH_3)CH_2O-$, or $-CH_2CH(OH)CH_2O-$; and n represents an integer of from 1 to 50. Here, E represents a hydrogen atom, a substituted or unsubstituted alkyl group having from 1 to 8 carbon atoms, an aryl group, an alkylcarbonyl group, or an arylcarbonyl group. Preferably, E represents a hydrogen atom, a methyl group, a ethyl group, a propyl group, an acetyl group, a propionyl group, or a benzoyl group.

a and d each independently represent an integer of from 1 to 6. In a case in which a and d represents 2 or more, the plural $R^3$s, Ds, and Es may be the same as or different from each other, respectively.

For the details of Formula (W) above and preferable embodiments, description of "Dispersant Represented by Formula (2)" described in paragraphs [0022] to [0026] of JP-A No. 2006-91780 can be referred to. Specific examples include the compounds shown below.

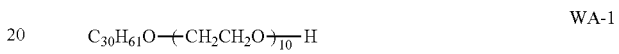

WA-1

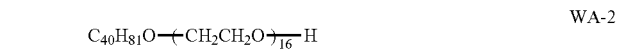

WA-2

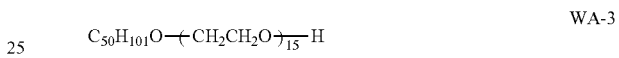

WA-3

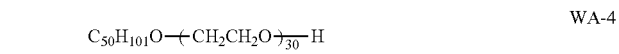

WA-4

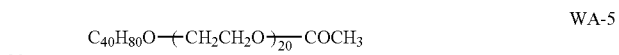

WA-5

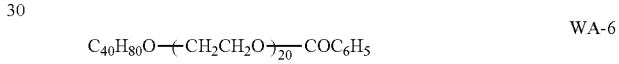

WA-6

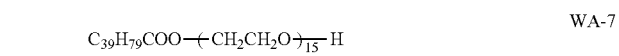

WA-7

WA-8

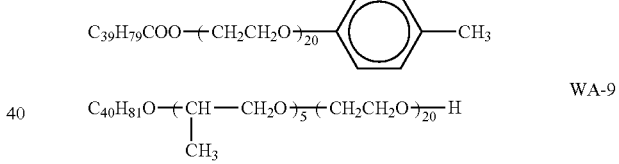

WA-9

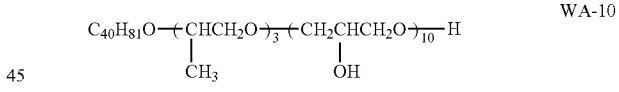

WA-10

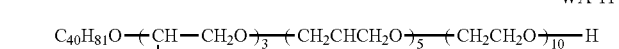

WA-11

WA-12

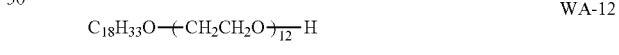

WA-13

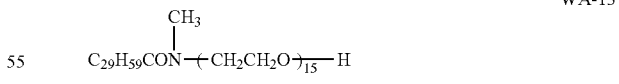

WA-14

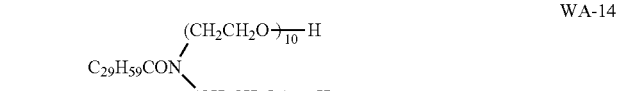

WA-15

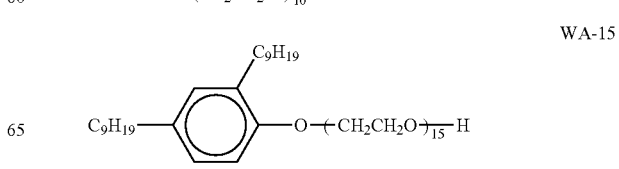

-continued

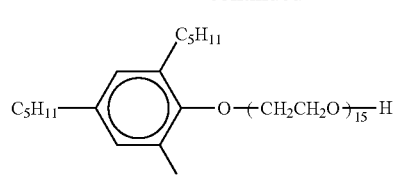
WA-16

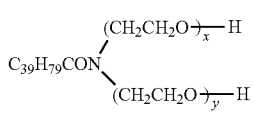
WA-17 x + y = 20

WA-18 x + y = 12

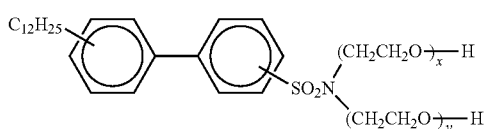
WA-19 x + y = 15

The wax is preferably added in the form of a dispersion, and water is preferably used as the solvent of the dispersion, but the invention is not limited thereto. For example, an ordinary organic solvent may be selected as appropriate and used at the time of dispersion. For the organic solvent, description in paragraph [0027] of JP-A No. 2006-91780 can be referred to.

The content of the wax in the ink composition is preferably from 0.1% by mass to 5% by mass, more preferably from 0.5% by mass to 4% by mass, and even more preferably from 0.5% by mass to 3% by mass, with respect to the total mass of the ink. When the content of the wax is 0.1% by mass or higher, the rub resistance of the image may be further improved. The content being 5% by mass or lower is advantageous in view of long-term storage stability of ink. From the viewpoint of ejection stability over a long-term, it is preferable that the content is from 0.5% by mass to 3% by mass.

(Resin Particles)

The ink composition of the present invention can contain at least one type of water-insoluble or substantially water-insoluble resin particles.

When the ink composition contains resin particles which are water insoluble or slightly soluble in water, other than the above resin that coats the pigment, the fixability of the ink composition to the recording medium and the rub resistance of the formed image may further be improved.

Here, the term "water-insoluble or substantially water-insoluble" water-insoluble resin as used above refers to a resin whose dissolution amount is 15 g or less, when the resin is dried at 105° C. for 2 hours, and then dissolved in 100 g of water at 25° C. From the viewpoint of improving the continuous ejection property and ejection stability of the ink, the dissolution amount is preferably 10 g or less, more preferably 5 g or less, and even more preferably 1 g or less. The dissolution amount is a dissolution amount when the resin has been 100% neutralized with sodium hydroxide or acetic acid, depending on the type of the salt-forming groups of the water-insoluble resin.

Examples of the water-insoluble resin particles include particles of a resin, for example, a thermoplastic, thermosetting, or modified acrylic-based, epoxy-based, polyurethane-based, polyether-based, polyamide-based, unsaturated polyester-based, phenol-based, silicone-containing or fluorine-containing resin; a polyvinyl-based resin such as vinyl chloride, vinyl acetate, polyvinyl alcohol, or polyvinyl butyral; a polyester-based resin such as an alkyd resin or a phthalic acid resin; an amino-based material such as a melamine resin, a melamine-formaldehyde resin, an aminoalkyd co-condensate resin, a urea resin, or a urea resin; or a copolymer or mixture thereof. Among the above resins, an anionic acrylic-based resin may be obtained, for example, by polymerizing an acrylic monomer having an anionic group (anionic group-containing acrylic monomer) and, as needs arise, other monomer(s) that can be copolymerized with the anionic group-containing acrylic monomer in a solvent. Examples of the anionic group-containing acrylic monomer include acrylic monomers having one or more groups selected from the group consisting of a carboxyl group, a sulfonic acid group and a phosphonic acid group. Among them, acrylic monomers having a carboxyl group (for example, acrylic acid, methacrylic acid, crotonic acid, ethacrylic acid, propylacrylic acid, isopropylacrylic acid, itaconic acid, fumaric acid, or the like) are preferable, and acrylic acid and methacrylic acid are particularly preferable.

The water-insoluble resin particles are preferably self-dispersing resin particles from the viewpoints or ejection stability and the liquid stability (particularly, dispersion stability) of the system including the pigment. The self-dispersing resin refers to a water-insoluble polymer which can get into a dispersed state in an aqueous medium due to functional groups (particularly, acidic groups or salts thereof) of the polymer itself, when dispersed by a phase inversion emulsification method in the absence of a surfactant.

The scope of the term "dispersed state" used herein includes both an emulsified state (i.e., emulsion) in which a water-insoluble polymer in the liquid state is dispersed in an aqueous medium and a dispersed state (i.e., suspension) in which a water-insoluble polymer in the solid state is dispersed in an aqueous medium.

The self-dispersing resin in the invention is preferably a self-dispersing resin that can take a dispersed state in which the water-insoluble polymer is dispersed in the solid state, from the viewpoint of ink fixability when the self-dispersing resin is contained in the ink composition.

The method of preparing an emulsified state or a dispersed state of the self-dispersing resin, i.e., the method of preparing an aqueous dispersion of the self-dispersing resin, may be a phase inversion emulsification method. The phase inversion emulsification method may be, for example, a method including: dissolving or dispersing a self-dispersing resin in a solvent (for example, a water-soluble organic solvent or the like); then directly pouring the obtained liquid into water without adding a surfactant; stirring and mixing the resulting liquid in a state in which the salt-forming groups (for example, acid groups) that the self-dispersing resin has are neutralized; and removing the solvent so as to obtain an aqueous dispersion in the emulsified or dispersed state.

The stably emulsified or dispersed state in the self-dispersing resin refers to a state which can be determined by the following procedure: a solution obtained by dissolving 30 g of a water-insoluble polymer in 70 g of an organic solvent (for example, methyl ethyl ketone), a neutralizing agent that can neutralize the salt-forming groups of the water-insoluble polymer to a degree of 100% (sodium hydroxide if the salt-forming groups are anionic, or acetic acid if the salt-forming groups are cationic), and 200 g of water are mixed and stirred (apparatus: a stirring apparatus having a stirring blade, rotation rate: 200 rpm, for 30 minutes, at 25° C.), and then the organic solvent is removed from the mixed liquid. If a stably emulsified or dispersed state is maintained for at least one week at 25° C. even after the removal of organic solvent from the mixed liquid and occurrence of precipitation is not confirmed by visual observation for at least one week at 25° C. after the removal of the organic solvent, the state of the water-insoluble resin in the mixed liquid is considered to be a stably emulsified or dispersed state.

Further, the stability of the emulsified or dispersed state of the self-dispersing resin can be confirmed also by an accelerated test of precipitation using centrifugal separation. In the accelerated test of precipitation using centrifugal separation, the stability can be evaluated by, for example, adjusting the aqueous dispersion of the resin particles obtained by the method described above to have a solids concentration of 25% by mass, performing centrifugal separation at 12,000 rpm for one hour, and measuring the solids concentration of the supernatant after the centrifugal separation.

When the ratio of the solids concentration after centrifugal separation to the solids concentration before centrifugal separation is large (a value close to 1), it is indicated that precipitation of the resin particles due to centrifugal separation does not occur; in other words, the aqueous dispersion of the resin particles is relatively more stable. In the invention, the ratio of the solids concentration after centrifugal separation to the solids concentration before centrifugal separation is preferably 0.8 or higher, more preferably 0.9 or higher, and particularly preferably 0.95 or higher.

In the self-dispersing resin, the content of the water-soluble components that exhibits water solubility when the self-dispersing resin is made into a dispersed state is preferably 10% by mass or lower, more preferably 8% by mass or lower, and even more preferably 6% by mass or lower. When the content of the water-soluble components is 10% by mass or lower, swelling of the resin particles or fusion between the resin particles is effectively suppressed, and a relatively more stable dispersed state can be maintained. In addition, an increase in the viscosity of the aqueous ink composition can be suppressed, and ejection stability becomes better, for example, in the case of employing the aqueous ink composition in an inkjet method.

The term "water-soluble component" as used herein refers to a compound which is included in the self-dispersing resin, and which dissolves in water in a case in which the self-dispersing resin is made into a dispersed state. The water-soluble component is a water-soluble compound which is generated as a by-product or is incorporated during the production of the self-dispersing resin.

The main chain skeleton of the water-insoluble resin is not particularly limited, and examples thereof include a vinyl polymer and a condensation polymer (an epoxy resin, polyester, polyurethane, polyamide, cellulose, polyether, polyurea, polyimide, polycarbonate, or the like). Among them, a vinyl polymer is particularly preferable.

Preferable examples of the vinyl polymer and monomers for forming the vinyl polymer may include those described in JP-A Nos. 2001-181549 and 2002-88294. Another example of the vinyl polymer, which can be used, is a vinyl polymer having a dissociative group at a terminal of the polymer chain that has been introduced by radical polymerization of a vinyl monomer using a chain transfer agent, a polymerization initiator, or an iniferter, each of which has a dissociative group (or a substituent that can be derivatized into a dissociative group), or by ion polymerization using a compound having a dissociative group (or a substituent that can be derivatized into a dissociative group) as either an initiator or a terminator.

Preferable examples of the condensation polymer and monomers for forming the condensation polymer may include those described in JP-A No. 2001-247787.

From the viewpoint of self-dispersibility, the particles of the self-dispersing resin preferably include a water-insoluble polymer that contains a hydrophilic constituent unit and a constituent unit derived from an aromatic group-containing monomer or a cyclic aliphatic group-containing monomer.

The above "hydrophilic constituent unit" is not particularly limited as long as the hydrophilic constituent unit is derived from a hydrophilic group-containing monomer, and may be a constituent unit derived from one type of hydrophilic group-containing monomer or a constituent unit derived from two or more types of hydrophilic group-containing monomers. The hydrophilic group is not particularly limited, and may be a dissociative group or a nonionic hydrophilic group. The hydrophilic group is preferably a dissociative group, and more preferably an anionic dissociative group, from the viewpoint of promoting self-dispersion and from the viewpoint of the stability of the formed emulsified or dispersed state. Examples of the dissociative group include a carboxyl group, a phosphoric acid group, and a sulfonic acid group. Among them, a carboxyl group is preferable from the viewpoint of fixability of the ink composition obtained.

The hydrophilic group-containing monomer is preferably a dissociative group-containing monomer, and more preferably a dissociative group-containing monomer having a dissociative group and an ethylenically unsaturated bond, from the viewpoints of self-dispersibility and aggregation properties. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxyethyl succinic acid.

Specific examples of the unsaturated sulfonic acid monomer include styrenesulfonic acid, 2-acrylamido-2-methylpropanesulfonic acid, 3-sulfopropyl(meth)acrylate, and a bis (3-sulfopropyl)itaconate ester.

Specific examples of the unsaturated phosphoric acid monomer include vinylphosphonic acid, vinyl phosphate, bis (methacryloyloxy ethyl)phosphate, diphenyl-2-acryloyloxy ethyl phosphate, diphenyl-2-methacryloyloxy ethyl phosphate, and dibutyl-2-acryloyloxy ethyl phosphate.

Among the dissociative group-containing monomers, unsaturated carboxylic acid monomers are preferable, acrylic monomers are more preferable, and acrylic acid and methacrylic acid are particularly preferable, from the viewpoints of dispersion stability and ejection stability.

The particles of the self-dispersing resin preferably include a polymer having a carboxyl group, and more preferably include a polymer which has a carboxyl group and has an acid value of from 25 mgKOH/g to 100 mgKOH/g, from the viewpoints of self-dispersibility and the aggregation speed when contacting with the treatment liquid during image formation using a treatment liquid. Further, from the viewpoint of self-dispersibility, the acid value is more preferably from 30 mgKOH/g to 90 mgKOH/g, and particularly preferably from 35 mgKOH/g to 65 mgKOH/g. When the acid value is 25 mgKOH/g or higher, the stability of self-dispersion properties may be improved. When the acid value is 100 mgKOH/g or lower, aggregation properties may be improved.

The aromatic group-containing monomer is not particularly limited as long as the monomer is a compound containing an aromatic group and a polymerizable group. The aromatic group may be a group derived from an aromatic hydrocarbon or a group derived from an aromatic heterocycle. In the present invention, the aromatic group is preferably an aromatic group derived from an aromatic hydrocarbon from the viewpoint of particle shape stability in an aqueous medium.

Further, the polymerizable group may be a condensation-polymerizable group or an addition-polymerizable group. In the present invention, the polymerizable group is preferably an addition-polymerizable group, and more preferably a group containing an ethylenically unsaturated bond, from the viewpoint of particle shape stability in an aqueous medium.

The aromatic group-containing monomer is preferably a monomer having an aromatic group derived from aromatic hydrocarbon and an ethylenically unsaturated bond. One type of the aromatic group-containing monomers may be used alone, or two or more types of them may be used in combination. Examples of the aromatic group-containing monomer include phenoxyethyl (meth)acrylate, benzyl(meth)acrylate, phenyl(meth)acrylate, and styrenic monomers. Above all, aromatic group-containing (meth)acrylate monomers are preferable, at least one selected from the group consisting of phenoxyethyl (meth)acrylate, benzyl(meth)acrylate, and phenyl(meth)acrylate is more preferable, and phenoxyethyl (meth)acrylate, and benzyl(meth)acrylate are even more preferable, from the viewpoints of the balance of hydrophilicity and hydrophobicity of the polymer chain and ink fixability.

The term "(meth)acrylate" as used herein means acrylate or methacrylate.

The cyclic aliphatic group-containing monomer is preferably a monomer having a cyclic aliphatic group derived from a cyclic aliphatic hydrocarbon and an ethylenically unsaturated bond, and more preferably a cyclic aliphatic group-containing (meth)acrylate monomer (hereinbelow, may be referred to as an "alicyclic(meth)acrylate").

The alicyclic(meth)acrylate refers to a compound which contains a structural moiety derived from (meth)acrylic acid and a structural moiety derived from an alcohol, in which the structural moiety derived from an alcohol has a structure containing at least one substituted or unsubstituted alicyclic hydrocarbon group (cyclic aliphatic group). Note that, the alicyclic hydrocarbon group may be a structural moiety derived from an alcohol itself, or may bond to a structural moiety derived from an alcohol through a linking group.

The alicyclic hydrocarbon group is not particularly limited as long as the group contains a cyclic non-aromatic hydrocarbon group, and examples thereof include a monocyclic hydrocarbon group, a bicyclic hydrocarbon group, and a polycyclic hydrocarbon group that is tri- or higher-cyclic. Examples of the alicyclic hydrocarbon group may include: a cycloalkyl group such as a cyclopentyl group or a cyclohexyl group; a cycloalkenyl group; a bicyclohexyl group; a norbornyl group; an isobornyl group; a dicyclopentanyl group; a dicyclopentenyl group; an adamantyl group; a decahydronaphthalenyl group; a perhydrofluorenyl group; a tricyclo [5.2.1.0$^{2,6}$]decanyl group; and bicyclo[4.3.0]nonane.

The alicyclic hydrocarbon group may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group. Further, the alicyclic hydrocarbon group may form a condensed ring. The alicyclic hydrocarbon group in the present invention preferably has an alicyclic hydrocarbon group portion having from 5 to 20 carbon atoms, from the viewpoints of viscosity and solubility.

Specific examples of alicyclic(meth)acrylates include the compounds described below, but the present invention is not limited to these specific examples.

Specific examples of alicyclic(meth)acrylates that are monocyclic include cycloalkyl (meth)acrylates containing a cycloalkyl group having from 3 to 10 carbon atoms, such as cyclopropyl(meth)acrylate, cyclobutyl (meth)acrylate, cyclopentyl(meth)acrylate, cyclohexyl(meth)acrylate, cycloheptyl(meth)acrylate, cyclooctyl(meth)acrylate, cyclononyl (meth)acrylate, and cyclodecyl(meth)acrylate.

Specific examples of alicyclic(meth)acrylates that are bicyclic include isobornyl(meth)acrylate and norbornyl (meth)acrylate.

Specific examples of alicyclic(meth)acrylates that are tricyclic include adamantyl(meth)acrylate, dicyclopentanyl (meth)acrylate, and dicyclopentenyloxy ethyl (meth)acrylate.

These alicyclic(meth)acrylates may be used alone or in a combination of two or more of them.

From among the above, the alicyclic(meth)acrylate is preferably at least one selected from a bicyclic (meth)acrylate or a polycyclic (meth)acrylate that is tri- or higher-cyclic, and more preferably at least one selected from the group consisting of isobornyl(meth)acrylate, adamantyl(meth)acrylate, and dicyclopentanyl(meth)acrylate, from the viewpoints of the dispersion stability of the self-dispersing resin particles, fixability, and blocking resistance.

The self-dispersing resin is preferably an acrylic resin including a constituent unit derived from a (meth)acrylate monomer, and more preferably an acrylic resin including a constituent unit derived from an aromatic group-containing (meth)acrylate monomer or an alicyclic(meth)acrylate. Even more preferably, the self-dispersing resin includes a constituent unit(s) derived from an aromatic group-containing (meth) acrylate monomer or an alicyclic(meth)acrylate, at a content of from 10% by mass to 95% by mass. When the content of the constituent unit(s) derived from aromatic group-containing (meth)acrylate monomer or alicyclic(meth)acrylate is from 10% by mass to 95% by mass, the stability of the self-emulsified or self-dispersed state is improved, and an increase in the ink viscosity can be further suppressed.

From the viewpoints of the stability of the self-dispersed state, stabilization of the particle shape in an aqueous medium due to hydrophobic interaction between aromatic rings, and reduction in the amount of water-soluble components through hydrophobization of the particles to an appropriate degree, the content of the constituent unit(s) derived from an aromatic group-containing (meth)acrylate monomer or an alicyclic(meth)acrylate is more preferably from 15% by mass to 90% by mass, even more preferably from 15% by mass to 80% by mass, and particularly preferably from 25% by mass to 70% by mass.

The self-dispersing resin may include, for example, a constituent unit derived from an aromatic group-containing monomer or a cyclic aliphatic group-containing monomer (preferably, an alicyclic(meth)acrylate), and a constituent unit derived from a dissociative group-containing monomer. The self-dispersing resin may further include one or more other constituent units (additional constituent units), as necessary.

The monomer that is used to form the additional constituent unit is not particularly limited as long as the monomer is copolymerizable with the aromatic group-containing monomer and the dissociative group-containing monomer. In particular, from the viewpoints of the flexibility of the polymer skeleton and the ease of the control of the glass transition temperature (Tg) of the polymer, the monomer is preferably an alkyl group-containing monomer (for example, alkyl (meth)acrylate such as methyl (meth)acrylate, ethyl (meth) acrylate, isopropyl(meth)acrylate, n-propyl(meth)acrylate, n-butyl (meth)acrylate, isobutyl (meth)acrylate, t-butyl (meth)acrylate, hexyl(meth)acrylate, or ethylhexyl(meth) acrylate).

The molecular weight of the water-insoluble polymer that forms the self-dispersing resin particles, in terms of weight average molecular weight, is preferably from 3,000 to 200,000, and more preferably from 5,000 to 150,000, and even more preferably from 10,000 to 100,000. When the weight average molecular weight is 3,000 or more, the amount of water-soluble components can be effectively reduced. Further, when the weight average molecular weight is 200,000 or less, the self-dispersion stability can be enhanced.

Note that, the weight average molecular weight is measured by gel permeation chromatography (GPC). Details of GPC are as described above.

The water-insoluble polymer that forms the self-dispersing resin particles preferably includes a structural unit(s) derived from an aromatic group-containing (meth)acrylate monomer (preferably, a structural unit derived from phenoxyethyl (meth)acrylate and/or a structural unit derived from benzyl (meth)acrylate) or a structural unit derived from a cyclic aliphatic group-containing monomer (preferably, a structural unit derived from an alicyclic (meth)acrylate), at a copolymerization ratio of from 15% by mass to 80% by mass relative to the total mass of the self-dispersing resin particles, from the viewpoint of the control of hydrophilicity and hydrophobicity of the polymer.

From the viewpoint of the control of hydrophilicity and hydrophobicity of the polymer, it is preferable that the water-insoluble polymer includes a constituent unit(s) derived from an aromatic group-containing (meth)acrylate monomer or an alicyclic (meth)acrylate, at a copolymerization ratio of from 15% by mass to 80% by mass, a constituent unit derived from a carboxyl group-containing monomer, and a constituent unit derived from an alkyl group-containing monomer (preferably, a structural unit derived from an alkyl ester of (meth) acrylic acid). It is more preferable that the water-insoluble polymer includes a structural unit(s) derived from phenoxyethyl (meth)acrylate and/or a structural unit derived from benzyl(meth)acrylate, at a copolymerization ratio of from 15% by mass to 80% by mass, a constituent unit derived from a carboxyl group-containing monomer, and a constituent unit derived from an alkyl group-containing monomer (preferably, a structural unit derived from an alkyl ester of (meth) acrylic acid in which the alkyl moiety of the alkyl ester has from 1 to 4 carbon atoms).

Specific examples of the water-insoluble resin that forms the resin particles include the following resins. However, the present invention is not limited to these specific examples. The ratios in the parentheses represent mass ratios of copolymerization components.

Phenoxyethyl acrylate/methyl methacrylate/acrylic acid copolymer (50/45/5)
Phenoxyethyl acrylate/benzyl methacrylate/isobutyl methacrylate/methacrylic acid copolymer (30/35/29/6)
Phenoxyethyl methacrylate/isobutyl methacrylate/methacrylic acid copolymer (50/44/6)
Phenoxyethyl acrylate/methyl methacrylate/ethyl acrylate/acrylic acid copolymer (30/55/10/5)
Benzyl methacrylate/isobutyl methacrylate/methacrylic acid copolymer (35/59/6)
Styrene/phenoxyethyl acrylate/methyl methacrylate/acrylic acid copolymer (10/50/35/5)
Benzyl acrylate/methyl methacrylate/acrylic acid copolymer (55/40/5)
Phenoxyethyl methacrylate/benzyl acrylate/methacrylic acid copolymer (45/47/8)
Styrene/phenoxyethyl acrylate/butyl methacrylate/acrylic acid copolymer (5/48/40/7)
Benzyl methacrylate/isobutyl methacrylate/cyclohexyl methacrylate/methacrylic acid (35/30/30/5)
Phenoxyethyl acrylate/methyl methacrylate/butyl acrylate/methacrylic acid copolymer (12/50/30/8)
Benzyl acrylate/isobutyl methacrylate/acrylic acid copolymer (93/2/5)
Methyl methacrylate/methoxyethyl acrylate/benzyl methacrylate/acrylic acid copolymer (44/15/35/6)
Styrene/butyl acrylate/acrylic acid copolymer (62/35/3)
Methyl methacrylate/phenoxyethyl acrylate/acrylic acid copolymer (45/51/4)
Methyl methacrylate/isobornyl methacrylate/methacrylic acid copolymer (20/72/8)
Methyl methacrylate/isobornyl methacrylate/methacrylic acid copolymer (40/52/8)
Methyl methacrylate/isobornyl methacrylate/dicyclopentanyl methacrylate/methacrylic acid copolymer (20/62/10/8)
Methyl methacrylate/dicyclopentanyl methacrylate/methacrylic acid copolymer (20/72/8)

It is preferable that the water-insoluble resin that forms the resin particles includes a polymer that has been synthesized in an organic solvent, that the polymer has an anionic group (for example, a carboxyl group), that some or all of the anionic groups (for example, carboxyl groups) of the polymer have been neutralized, and that the polymer is prepared in the form of a polymer dispersion (dispersion) in which the continuous phase is water. In other words, the production of the water-insoluble resin particles preferably includes a process of synthesizing a polymer in an organic solvent, and a dispersing process of forming an aqueous dispersion of the polymer in which some or all of the anionic groups (for example, carboxyl groups) thereof have been neutralized. The dispersing process preferably includes the following process (1) and process (2).

Process (1): a process of stirring a mixture containing a polymer (water-insoluble polymer), an organic solvent, a neutralizing agent, and an aqueous medium.
Process (2): a process of removing the organic solvent from the mixture.

The process (1) is preferably a process including dissolving a polymer (water-insoluble polymer) in an organic solvent, first, and then gradually adding a neutralizing agent and an aqueous medium thereto, followed by mixing and stirring to obtain a dispersion. When a neutralizing agent and an aqueous medium are added to a water-insoluble polymer solution in which a water-insoluble polymer is dissolved in an organic solvent as in the above process, self-dispersing resin particles which have a higher stable diameter during storage can be obtained without requiring a strong shearing force. The method of stirring the mixture is not particularly limited, and a generally-used mixing stirrer or, if necessary, a disperser such as an ultrasonic disperser or a high-pressure homogenizer may be used.

In the process (2), the organic solvent is evaporated from the dispersion obtained through the process (1) by a common method such as distillation under reduced pressure to convert the phase into an aqueous system, thereby obtaining an aqueous dispersion of self-dispersing resin particles. The obtained aqueous dispersion is substantially free from the organic solvent, and the amount of residual organic solvent is preferably 0.2% by mass or less, and more preferably 0.1% by mass or less.

Preferable examples of the organic solvent include alcohol solvents, ketone solvents, and ether solvents. Examples of alcohol solvents include isopropyl alcohol, n-butanol, t-butanol, and ethanol. Examples of ketone solvents include acetone, methyl ethyl ketone, diethyl ketone, and methyl isobutyl ketone. Examples of ether solvents include dibutyl ether and dioxane. Among the above solvents, ketone solvents such as methyl ethyl ketone, and alcohol solvents such as isopropyl alcohol are preferable. It is also preferable to use isopropyl alcohol and methyl ethyl ketone in combination, in order to make milder the polarity change at the time of phase inversion from an oil system into an aqueous system. By using the solvents in combination, self-dispersing resin particles having very small particle diameters, which are free from aggregation precipitation or fusion between the particles, and have high dispersion stability, can be obtained.

The neutralizing agent is used to neutralize some or all of the dissociative groups of the polymer so as to allow the polymer to get into a stable emulsified or dispersed state in water. In a case in which the water-insoluble resin particles have anionic dissociative groups (for example, carboxyl groups) as dissociative groups, examples of the neutralizing agent which is to be used include basic compounds such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of stabilization of the dispersion of the self-dispersing resin particles according to the invention in water.

The average particle diameter of the self-dispersing resin particles in terms of volume average particle diameter is preferably in a range of from 10 nm to 400 nm, more preferably in a range of from 10 nm to 200 nm, and even more preferably in a range of from 10 nm to 100 nm. When the volume average particle diameter is 10 nm or more, production suitability may be improved, and when the average particle diameter is 400 nm or less, storage stability may be improved.

There is no particular limitation concerning the particle diameter distribution of the self-dispersing resin particles, and the particles may exhibit a wide particle diameter distribution or may exhibit a monodispersed particle diameter distribution. Two or more types of the water-insoluble particles may be used by mixing them.

The average particle diameter and particle diameter distribution of the self-dispersing resin particles can be obtained by measuring a volume average particle diameter thereof by a dynamic light scattering method using a particle size distribution analyzer NANOTRAC UPA-EX150 (trade name, manufactured by Nikkiso Co., Ltd.).

The glass transition temperature (Tg) of the water-insoluble resin is preferably 30° C. or higher, more preferably 40° C. or higher, and even more preferably 50° C. or higher, from the viewpoint of storage stability of the ink composition.

The content of the resin particles in the ink composition is preferably from 0.5% by mass to 10% by mass, and more preferably from 1% by mass to 9% by mass, with respect to the total amount (on the basis of mass) of the ink composition. When the content of the resin particles is 0.5% by mass or higher, rub resistance of the image may be improved. The content of the resin particles being 10% by mass or lower is advantageous in view of ejection stability over a long-term of the ink composition obtained.

(Polyoxyethylene-Polyoxypropylene Copolymer)

The ink composition of the present invention preferably contains a polyoxyethylene-polyoxypropylene copolymer.

By the inclusion of a polyoxyethylene-polyoxypropylene copolymer, in addition to the inclusion of the above-described at least one of PVP, PVA, or PEG, the effects of the at least one of PVP, PVA, or PEG on the suppression of ink adhesive property, improvement in continuous ejection property, suppression of non-ejection, and suppression of ejection deviation may be more effectively realized.

As the polyoxyethylene-polyoxypropylene copolymer, specifically, a block copolymer containing a polyoxyethylene block and a polyoxypropylene block can be used.

The weight average molecular weight of the polyoxyethylene-polyoxypropylene copolymer is preferably from 2,000 to 100,000, more preferably from 2,000 to 50,000 from the viewpoint of maintaining a good continuous ejection property, and particularly preferably from 5,000 to 30,000 from the viewpoint of suppression of ejection deviation.

The polyoxyethylene-polyoxypropylene copolymer is preferably a copolymer containing polyoxyethylene in an amount of from 30% by mass to 90% by mass, more preferably a copolymer containing polyoxyethylene in an amount of from 50% by mass to 90% by mass from the viewpoint of maintaining a good continuous ejection property, and particularly preferably a copolymer containing polyoxyethylene in an amount of from 60% by mass to 90% by mass from the viewpoint of suppression of ejection deviation.

Examples of commercially available products of polyoxyethylene-polyoxypropylene copolymer include NEWPOL PE64, NEWPOL PE68, NEWPOL PE78, NEWPOL PE108, and NEWPOL PE128 (all trade names, manufactured by Sanyo Chemical Industries, Ltd.), PEP 101 (trade name, manufactured by Freund Corporation), ADEKA PLURONIC F-87, ADEKA PLURONIC L-44, ADEKA PLURONIC F68, and ADEKA PLURONIC L-31 (all trade names, manufactured by ADEKA CORPORATION), UNILUB, UNILUB 40DP-40B, UNILUB 70DP-950B, UNILUB 75DE-2620R, and PLONON (all trade names, manufactured by NOF Corporation), and LUTROL F68 (trade name, manufactured by BASF Japan Ltd.).

In a case in which the ink composition of the present invention contains the polyoxyethylene-polyoxypropylene copolymer, the content of the polyoxyethylene-polyoxypropylene copolymer is preferably from 0.01% by mass to 1.00% by mass, with respect to the total mass of the ink composition. When the content is within this range, the various effects of the at least one of PVP, PVA, or PEG may be more effectively realized.

The content of the polyoxyethylene-polyoxypropylene copolymer is more preferably from 0.01% by mass to 0.5% by mass, even more preferably from 0.05% by mass to 0.5% by mass, still more preferably from 0.05% by mass to 0.2% by mass, and particularly preferably from 0.05% by mass to 0.1% by mass, with respect to the total mass of the ink composition.

(Urea or Urea Derivative)

The ink composition of the present invention preferably contains urea or a urea derivative. When urea or a urea derivative is used, in a case in which an ink composition containing a pigment is adhered, cleaning properties by wiping or the like may be improved. In particular, in a case in which the ink composition contains the resin particles described above, when urea or a urea derivative is contained, the wiping properties when the ink composition is dried and solidified may be improved.

Further, in a case in which the ink is heated at a high temperature, there are cases in which the pH of the liquid increases due to decomposition of urea. In this case, members inside the head may be corroded by etching, and the adhesion and deposition of ink may be increased, and accordingly ejection deviation or non-ejection may be further readily caused. The ink of the present invention demonstrates the effects (prevention of ejection deviation and non-ejection) of the invention even when the pH varies as described above.

Examples of the urea derivative include a compound obtained by substituting a hydrogen atom on the nitrogen of urea with an alkyl group or an alkanol group, thiourea, and a compound obtained by substituting a hydrogen atom on the nitrogen of thiourea with an alkyl group or an alkanol group. Specific examples of the urea derivative include N,N-dimethylurea, thiourea, ethyleneurea, hydroxyethylurea, hydroxybutylurea, ethylenethiourea, and diethylthiourea.

The content of urea or the urea derivative in the ink composition is preferably from 1.0% by mass to 20.0% by mass, and more preferably from 2.0% by mass to 15.0% by mass, with respect to the total mass of the ink composition.

When the content of urea or the urea derivative is 1.0% by mass or higher, it becomes easy to wipe out the adhered ink in a case in which ink has been adhered, and maintenance properties may be improved. The content of urea or the urea derivative being 20.0% by mass or lower is advantageous in view of prevention of stickiness due to the moisture absorption of the urea or the urea derivative contained in the image and prevention of blocking.

(Water)

The ink composition of the invention includes water. The content of water is not particularly limited, and is preferably in a range of from 10% by mass to 99% by mass, more preferably from 30% by mass to 80% by mass, and even more preferably from 50% by mass to 70% by mass.

(Other Components)

In addition to the above components, the ink composition of the invention can further contain one or more other components, such as additives, as necessary. Examples of other components include known additives such as anti-fading agents, emulsion stabilizers, penetration promoters, ultraviolet absorbers, preservatives, antifungal agents, pH adjusters, surface tension adjusters, antifoamers, viscosity adjustment agents, dispersants, dispersion stabilizers, antirust agents, and chelating agents. These various additives may be directly added after the preparation of the ink composition, or may be added during the preparation of the ink composition. Specific examples of the additives include the additives described as other additives in paragraphs [0153] to [0162] of JP-A No. 2007-100071.

Examples of surface tension adjusters include nonionic surfactants, cationic surfactants, anionic surfactants, and betaine surfactants. The content of the surface tension adjuster is preferably a content that adjusts the surface tension of the ink composition to be from 20 mN/m to 60 mN/m, more preferably from 20 mN/m to 45 mN/m, and even more preferably from 25 mN/m to 40 mN/m, in order to achieve satisfactory droplet ejection by an inkjet method. The surface tension of the ink composition can be measured at 25° C. using, for example, a plate method.

In regard to specific examples of surfactants, preferable hydrocarbon surfactants include: anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates, or polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, or glycerin fatty acid esters. Further, SURFYNOLS (trade name, manufactured by Air Products & Chemicals, Inc.) and OLFINE E1010 (trade name, manufactured by Nisshin Chemical Industry Co., Ltd.), which are acetylene polyoxyethylene oxide surfactants, are preferably used. Moreover, amine oxide amphoteric surfactants such as N,N-dimethyl-N-alkylamine oxide, and the like are also preferable. Further, surfactants described in pages (37) to (38) of JP-A No. 59-157636 and Research Disclosure No. 308119 (1989) are also usable. Use of fluorocarbon (fluorinated alkyl) surfactants, silicone surfactants, or the like, such as those described in JP-A Nos. 2003-322926, 2004-325707, and 2004-309806, can further improve rub resistance.

The surface tension adjuster may also be used as an antifoamer, and may be a fluorine-containing compound, a silicone compound, or a chelating agent of which a representative example is EDTA (ethylenediaminetetraacetic acid).

—Viscosity—

In a case in which an ink is applied by an inkjet method, from the viewpoints of ink droplet ejection stability and the coagulation speed, the viscosity of the ink composition of the invention is preferably in a range of from 1 mPa·s to 30 mPa·s, more preferably in a range of from 1 mPa·s to 20 mPa·s, even more preferably in a range of from 2 mPa·s to 15 mPa·s, and particularly preferably in a range of from 2 mPa·s to 10 mPa·s. The viscosity of the ink composition can be measured at 20° C. using, for example, a Brookfield viscometer.

—pH—

It is preferable that the ink composition of the invention has a pH of from 7.5 to 10.0, and more preferably has a pH of from 8.0 to 9.5, from the viewpoints of ink stability and the coagulation speed. Note that, the pH of the ink composition is measured at 25° C. using a generally-used pH analyzer (for example, HM-30R (trade name), manufactured by DKK-TOA Corporation).

Further, the pH of the ink composition can be appropriately adjusted by using an acidic compound or a basic compound. As the acidic compound or the basic compound, a generally used compound can be used without any particular limitation.

In the image forming method of the present invention, image formation is preferably carried out using an ink set that includes the ink composition (and, as needs arise, one or more ink compositions having another hue) and a treatment liquid capable of causing formation of an aggregate when contacting with the ink composition. The ink set can be used in the form of an ink cartridge that integrally accommodates the ink composition(s) and treatment liquid(s) or ink cartridges that independently accommodate the ink composition(s) and treatment liquid(s). The use of the ink cartridge is preferable from the viewpoints of convenience in handling and the like. Ink cartridges configured to include an ink set are known in the relevant technical field, and ink cartridge can be prepared by appropriately using a known method.

<Ink Set>

The ink set of the present invention includes the ink composition of the invention, and a treatment liquid containing an aggregating component capable of causing formation of an aggregate when contacting with the ink composition. Since the ink set of the invention includes the ink composition described above, an image with excellent rub resistance is obtained, and in a case in which image formation is performed while repeating ejection of an ink liquid and temporary suspension of ejection, ejection deviation and non-ejection of ink are prevented, and image defects such as image voids are suppressed, and as a result, high resolution images are stably formed over a long period of time. Further, since the ink hardly sticks, and the adhered ink is less likely to grow to become a fixed substance, the ink exhibits excellent maintenance properties.

Details of the ink composition are as described above.

The treatment liquid according to the present invention is an aqueous composition capable of causing formation of an aggregate when contacting with the ink composition. Specifically, the treatment liquid according to the invention includes at least an aggregating component which, when mixed with the ink composition, can aggregate dispersed particles such as coloring particles (a pigment or the like) included in the ink composition, thereby forming an aggregate. The treatment liquid may further include other components, if necessary. By using the treatment liquid together with the ink composition, inkjet recording may be speeded up, and even when high speed recording is performed, an image having high density and high resolution may be obtained.

The treatment liquid includes at least one aggregating component capable of causing formation of an aggregate when contacting with the ink composition. As a result of mixing the treatment liquid with the ink composition ejected by an inkjet method, the aggregation of a pigment or the like which has been stably dispersed in the ink composition is promoted.

Examples of the treatment liquid include a liquid composition which can generate an aggregate by changing the pH of the ink composition. In this process, the pH (at 25° C.) of the treatment liquid is preferably from 1 to 6, more preferably from 1.2 to 5, and even more preferably from 1.5 to 4, from the viewpoints of the coagulation speed of the ink composition. In this case, the pH (at 25° C.) of the ink composition used in the ejection process is preferably from 7.5 to 10.0 (more preferably from 7.5 to 9.5, still more preferably from 8.0 to 9.5, and particularly preferably from 8.0 to 9.0).

In particular, it is preferable that the pH (at 25° C.) of the ink composition is 7.5 or higher, and the pH (at 25° C.) of the treatment liquid is from 3 to 5, from the viewpoints of the image density, the resolution, and speeding-up of inkjet recording.

One type of the aggregating components may be used alone, or two or more types of them may be used by mixing them.

The treatment liquid may include at least one acidic compound as an aggregating component. Examples of the acidic compound, which can be used, include a compound having a phosphoric acid group, a phosphonic acid group, a phosphinic acid group, a sulfuric acid group, a sulfonic acid group, a sulfinic acid group, or a carboxyl group, and a salt thereof (for example, a polyvalent metal salt). Among them, a compound having a phosphoric acid group or a carboxyl group is preferable, and a compound having a carboxyl group is more preferable, from the viewpoint of the coagulation speed of the ink composition.

The compound having a carboxylic group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives of such compound, salts thereof (for example, polyvalent metal salts), or the like. One of these compounds may be used alone or two or more of these compounds may be used in combination.

The treatment liquid in the present invention may further include an aqueous solvent (for example, water), in addition to the acidic compound.

The content of the acidic compound(s) in the treatment liquid is preferably from 5% by mass to 95% by mass, and more preferably from 10% by mass to 80% by mass, with respect to the total mass of the treatment liquid, from the viewpoint of aggregation effect.

A preferable example of the treatment liquid that improves the high speed coagulation properties may be a treatment liquid that contains a polyvalent metal salt or polyallylamine. Examples of the polyvalent metal salt include salts of alkaline earth metals belonging to Group 2 of the periodic table (for example, magnesium or calcium), salts of transition metals belonging to Group 3 of the periodic table (for example, lanthanum), salts of cations of elements belonging to Group 13 of the periodic table (for example, aluminum), salts of lanthanides (for example, neodium). Examples of polyallylamine include polyallylamine and polyallylamine derivatives. As the metal salts, carboxylic acid salts (such as, salts of formic acid, salts of acetic acid, or salts of benzoic acid), nitric acid salts, chlorides, and thiocyanic acid salts are preferable. Among them, a calcium salt or a magnesium salt of a carboxylic acid (such as formic acid, acetic acid, or benzoic acid), a calcium salt or a magnesium salt of nitric acid, calcium chloride, magnesium chloride, and a calcium salt or a magnesium salt of thiocyanic acid are more preferable.

The content of the metal salt(s) in the treatment liquid is preferably from 1% by mass to 10% by mass, more preferably from 1.5% by mass to 7% by mass, and even more preferably in a range of from 2% by mass to 6% by mass.

The viscosity of the treatment liquid is preferably in a range of from 1 mPa·s to 30 mPa·s, more preferably in a range of from 1 mPa·s to 20 mPa·s, even more preferably from 2 mPa·s to 15 mPa·s, and particularly preferably from 2 mPa·s to 10 mPa·s, from the viewpoint of the coagulation speed of the ink composition. The viscosity is measured under a condition of 20° C. using VISCOMETER TV-22 (trade name, manufactured by TOKI SANGYO CO., LTD.).

The surface tension of the treatment liquid is preferably from 20 mN/m to 60 mN/m, more preferably from 20 mN/m to 45 mN/m, and even more preferably from 25 mN/m to 40 mN/m, from the viewpoint of the coagulation speed of the ink composition. The surface tension is measured under a condition of 25° C. using AUTOMATIC SURFACE TENSIOMETER CBVP-Z (trade name, manufactured by Kyowa Interface Science Co., Ltd.).

<Image Forming Method>

The image forming method of the present invention is configured to include an ink application process of ejecting the above-described ink composition of the present invention or an ink composition included in the above-described ink set of the present invention by an inkjet method from an ejection head onto a recording medium, in which the ejection head is equipped with plural nozzle holes that eject liquid droplets, each of the nozzle holes including an internal surface that includes a film containing a silicon atom. The image forming method of the present invention preferably includes, in addition to the above described ink application process, a treatment liquid application process of applying, onto the recording medium, a treatment liquid containing an aggregating component that causes formation of an aggregate when contacted with the ink composition that is applied in the ink application process. The image forming method of the present invention may further include on or more other processes, such as a heating and fixing process of fixing the ink image formed by the application of the ink onto the recording medium by heating, as necessary.

With the use of the ink composition described above, an image which exhibits excellent rub resistance may be formed, and in a case in which image formation is performed while repeating ejection of an ink liquid and temporary suspension of ejection, ejection deviation and non-ejection of ink are prevented, and image defects such as image voids may be suppressed and, as a result, high resolution images may be stably formed over a long period of time. Further, the ink hardly sticks, and adhered ink is less likely to grow to become a fixed substance, and thus, the ink exhibits excellent maintenance properties.

—Ink Application Process—

In the ink application process, the above-described ink composition of the present invention or an ink composition included in the above-described ink set of the present invention is ejected by an inkjet method from an ejection head onto a recording medium, in which the ejection head is equipped with plural nozzle holes, that eject liquid droplets, and a film containing a silicon atom (for example, a film of silicone or an oxide thereof (for example, an $SiO_2$ film)) on the surface of the inside of the nozzle holes, to record an image. The details of the ink composition used in the present process, such as the details of the components and preferable embodiments, are as described above.

The inkjet method is not particularly limited, and may be any known method such as a charge-control method in which ink is ejected using an electrostatic attraction force, a piezoelectric inkjet method in which ink is ejected using a piezoelectric element that generates a mechanical deformation when a voltage is applied, an acoustic inkjet method in which ink is ejected using a radiation pressure generated by irradiation of ink with acoustic beams that have been converted from electric signals, and a thermal inkjet method in which ink is ejected using a pressure generated by formation of bubbles caused by heating of ink (BUBBLEJET®.

Specific methods of the inkjet method include a method in which a large number of small-volume droplets of an ink having a low concentration, which is referred to as a photoink, are ejected, a method in which plural inks having different concentrations and substantially the same hue are used so as to improve the image quality, and a method in which a colorless and transparent ink is used.

As the inkjet method in the present invention, an embodiment in which ink is ejected by a piezoelectric inkjet method is preferable. The combination of the ink composition of the invention or the ink set including the ink composition with the piezoelectric inkjet method further improves the continuous ejection property and ejection stability of the ink.

In the piezoelectric inkjet method, the distortion mode of a piezoelectric element may be any one of a bending mode, a longitudinal mode, or a sheer mode. The configuration of the piezoelectric element and the structure of the piezo head are not particularly limited, and any one of known techniques may be used.

The ink nozzles and other used for recording by an inkjet method are not particularly limited, and may be selected, as appropriate, in accordance with the purpose.

Further, the inkjet method to be employed may be a shuttle system in which recording is carried out while a short serial head is moved in the width direction of a recording medium, or a line system in which a line head at which recording elements are arranged so as to correspond to the entire length of one side of the recording medium. In the line system, an image can be recorded on the entire surface of a recording medium by simply moving the recording medium in the direction perpendicular to the direction in which the recording elements are arranged. In addition, since only the recording medium is moved, recording at a recording speed higher than that in the shuttle system can be achieved.

The liquid droplet volume of the ink ejected from the inkjet head is preferably from 0.2 pL to 10 pL (pico-liter), and more preferably from 0.4 pL to 5 pL. The maximum total ejection amount of ink during image recording is preferably in a range of from 10 mL/m² to 36 mL/m², and more preferably in a range of from 15 mL/m² to 30 mL/m².

—Treatment Liquid Application Process—

In the treatment liquid application process, a treatment liquid containing an aggregating component capable of causing formation of an aggregate when contacting with the ink composition is applied onto a recording medium. The details of the treatment liquid used in the present process, such as the components of the treatment liquid and preferable embodiments thereof, are as described above.

The application of the treatment liquid can be performed by employing a known method such as a coating method, an inkjet method, or a dipping method. The coating method may be a known coating method using a bar coater, an extrusion die coater, an air doctor coater, a blade coater, a rod coater, a knife coater, a squeeze coater, a reverse roll coater, or the like. The details of the inkjet method are the same as in the ink application process described above.

The treatment liquid application process may be conducted either before or after the ink application process described above. In the present invention, an embodiment in which the ink application process is conducted after the treatment liquid application process is preferable. That is, an embodiment in which the treatment liquid for aggregating a coloring material (preferably, a pigment) in the ink is applied onto a recording medium in advance of the application of the ink, and then the ink is applied so as to be in contact with the treatment liquid that has been applied onto the recording medium, to form an image is preferable. Thereby, image formation may be speeded up, and even when high speed image formation is performed, an image having high density and high resolution may be obtained.

The amount of the treatment liquid to be applied is not particularly limited as long as the treatment liquid is capable of coagulating the ink. The amount of the treatment liquid to be applied is preferably an amount such that the amount of aggregating components applied is 0.1 g/m² or more. In particular, the amount of the treatment liquid to be applied is more preferably an amount such that the amount of aggregating components applied is from 0.1 g/m² to 1.0 g/m², and more preferably from 0.2 g/m² to 0.8 g/m². When the amount of aggregating components applied is 0.1 g/m² or more, the aggregation reaction proceeds favorably. When the amount of aggregating components applied is 1.0 g/m² or less, glossiness is not excessively high, and thus the amount is preferable.

Further, in the present invention, it is preferable that the ink application process is conducted after the treatment liquid application process, and that a heating and drying process of drying the treatment liquid on the recording medium by heating is further conducted during a period from after the application of the treatment liquid onto the recording medium to the application of the ink composition. When drying, by heating, of the treatment liquid has been performed in advance of the ink application process, ink coloring properties such as prevention of bleeding become good, and a visible image having good color density and good hue can be recorded.

The heating and drying may be conducted by using a known heating means such as a heater, a blowing means utilizing air blow such as a dryer, or a combination thereof. Examples of a method of heating include a method of applying heat by using a heater or the like from a side of the recording medium opposite from the face applied with the treatment liquid, a method of blowing warm air or hot air to the face of the recording medium applied with the treatment liquid, and a method of heating by using an infrared heater. Further, two or more of these methods may be combined and used for the heating.

—Heating and Fixing Process—

In the present invention, it is preferable that a heating and fixing process of fixing the ink on the recording medium by heating is carried out after the ink application process. In the heating and fixing process, the recorded image formed by the application of the treatment liquid and the ink is fixed to the recording medium by heating. When the heating and fixing treatment has been performed, the image on the recording medium is fixed, and the rub resistance of the image can be further enhanced. Therefore, the image forming method of the present invention preferably includes the heating and fixing process.

The heating is preferably carried out at a temperature that is equal to or higher than the minimum film-forming temperature (MFT) of the resin particles in the image. When the resin particles in the image are heated to a temperature that is equal to or higher than the MFT, the particles transform into a film, thereby strengthening the image.

In a case in which pressure is applied together with heat, the pressure to be applied at the time of application of pressure is preferably in a range of from 0.1 MPa to 3.0 MPa, more preferably in a range of from 0.1 MPa to 1.0 MPa, and even more preferably in a range of from 0.1 MPa to 0.5 MPa, from the viewpoint of realizing surface smoothness.

The method of heating is not particularly limited, and preferable examples thereof may include methods of non-contact drying such as a method of heating using a heat generator, for example, a NICHROME wire heater or the like; a method of supplying warm air or hot air; and a method of heating using a halogen lamp, an infrared lamp, or the like. The method of applying heat and pressure is not particularly limited, and preferable examples thereof include methods of performing heating and fixing by contact such as a method of pressing a hot plate against an image-formed surface of the recording medium; and a method of passing the image through a pair of rollers or the like, using a heating and pressurization apparatus equipped with a pair of heating and pressurization rollers, a pair of heating and pressurization belts, or a heating and pressurization belt disposed at the side of the image-recorded surface of the recording medium and a support roller disposed at the opposite side of the recording medium.

In a case of applying heat and pressure, the nip time is preferably from 1 msec to 10 sec, more preferably from 2 msec to 1 sec, and even more preferably from 4 msec to 100 msec. The nip width is preferably from 0.1 mm to 100 mm, more preferably from 0.5 mm to 50 mm, and even more preferably from 1 mm to 10 mm.

The heating and pressurization roller may be a metal roller made of metal, or a roller having a metal core made of metal, in which the outer surface thereof is coated with a coating layer made of an elastic material and, as necessary, a surface layer (also referred to as a release layer). The metal core in the latter case may be, for example, a cylindrical body made of iron, aluminum, SUS (stainless steel), or the like. It is preferable that at least a part of the surface of the metal core is coated with a coating layer. Particularly, the coating layer is preferably formed by using a silicone resin or a fluororesin, each of which has release properties. Further, it is preferable that a heat generator is placed in the interior of the metal core of one of the heating and pressurization rollers. Heating treatment and pressure application treatment may be performed simultaneously by passing the recording medium between the rollers. In an embodiment, the recording medium is heated by being nipped between two heating rollers, if necessary. Preferable examples of the heat generator include a halogen lamp heater, a ceramic heater, and a NICHROME wire.

The belt substrate for forming the heating and pressurization belt for use in the heating and pressurization apparatus is preferably a seamless electroformed nickel, and the thickness of the substrate is preferably from 10 µm to 100 µm. Examples of a material of the belt substrate, which can be used, include aluminum, iron, and polyethylene, as well as nickel. In a case in which a silicone resin or a fluororesin is provided, the thickness of a layer formed by using the resin is preferably from 1 µm to 50 µm, and more preferably from 10 µm to 30 µm.

In order to realize the pressure (nip pressure) described above, for example, elastic members that exhibit tension, such as a spring, may be selected and disposed at both ends of rollers, such as a heating and pressurization roller, such that a desired nip pressure can be obtained in consideration of the nip gap.

In a case in which heating and pressurization rollers or heating and pressurization belts are used, the conveyance speed of the recording medium is preferably from 200 mm/sec to 700 mm/sec, more preferably from 300 mm/sec to 650 mm/sec, and even more preferably from 400 mm/sec to 600 mm/sec.

—Recording Medium—

In the image forming method of the present invention, the recording medium on which an image is to be formed is not particularly limited, and may be coated paper used for general offset printing and the like, or paper specialized for inkjet recording.

The coated paper is paper obtained by applying a coating material onto a surface of high-quality paper or acid-free paper, which is cellulose-based and generally not surface-treated, to form a coating layer. The coated paper may be a commercially available product. Specific examples thereof include high-quality papers (A) such as PRINCE WOOD FREE (trade name) manufactured by Oji Paper Co., Ltd., SHIRAOI (trade name) manufactured by Nippon Paper Industries Co., Ltd., and "NEW NPI JO-SHITSU" (New NPI HIGH-QUALITY; trade name) manufactured by Nippon Paper Industries Co., Ltd.; "Bitokoshi" (very light weight coated papers) such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd.

The coated paper is a material which absorbs ink only slowly. However, in the present invention, even in a case in which such a material is used, an image in which generation of image transfer (color transfer) between recording media is suppressed and which has excellent rub resistance can be recorded at a high speed. Therefore, use of a coated paper is preferable.

EXAMPLES

Hereinafter, the present invention will be specifically described with reference to Examples, but the present invention is not limited to these Examples unless exceeds the subject matter of the invention. Unless stated otherwise, "parts" represents parts by mass.

Example 1

<Preparation of Ink>
—Synthesis of Water-Insoluble Polymer 1—

88 g of methyl ethyl ketone were added to a 1000 mL three-necked flask equipped with a stirrer and a condenser tube, and were heated to 72° C. under a nitrogen atmosphere. To this, a solution obtained by dissolving 0.85 g of dimethyl 2,2'-azobis(isobutyrate), 60 g of benzyl methacrylate, 10 g of methacrylic acid, and 30 g of methyl methacrylate in 50 g of methyl ethyl ketone was added dropwise over 3 hours. After the addition was completed, the mixture was reacted for an additional one hour, and then a solution obtained by dissolving 0.40 g of dimethyl 2,2'-azobis(isobutyrate) in 2 g of methyl ethyl ketone was added thereto. The temperature was raised to 80° C., and the mixture was heated for 4 hours. The resulting reaction liquid was reprecipitated twice in an excess amount of hexane, and the separated resin was dried to obtain 95 g of a water-insoluble polymer 1.

The composition of the obtained water-insoluble polymer was confirmed by $^1$H-NMR. The weight average molecular weight (Mw) thereof as determined by GPC was 42,000. Further, the acid value of this polymer was determined by the method described in JIS Standards (JIS K0070: 1992), and was found to be 65.8 mgKOH/g.

—Preparation of Resin-Coated Pigment Dispersion—
(Preparation of Resin-Coated Cyan Pigment Dispersion A)

The components in the formulation described below were mixed, and the resulting mixture was subjected to dispersion for a period of from 3 hours to 6 hours using a bead mill with zirconia beads having a diameter of 0.1 mm. Subsequently, from the resulting dispersion, the methyl ethyl ketone was removed under reduced pressure at 55° C., and further a portion of water was removed, to prepare a resin-coated cyan pigment dispersion A having a cyan pigment concentration of 15% by mass.

<Formulation of Resin-Coated Cyan Pigment Dispersion A>

| | |
|---|---|
| C. I. Pigment Blue 15:3 pigment powder (trade name: PHTHALOCYANINE BLUE A220, manufactured by Dainichiseika Color & Chemicals Mfg. Co., Ltd.) | 10.0 parts |
| Water-insoluble polymer 1 described above (water-insoluble resin) | 4.0 parts |
| Methyl ethyl ketone (organic solvent) | 30.5 parts |
| 1 mol/L NaOH aqueous solution (neutralizing agent) | 5.6 parts |
| Ion exchanged water | 98.7 parts |

(Preparation of Resin-Coated Magenta Pigment Dispersion B)

Preparation of a resin-coated magenta pigment dispersion B was conducted in substantially the same manner as that in the preparation of the resin-coated cyan pigment dispersion A, except that the formulation used in the preparation of the resin-coated cyan pigment dispersion A was changed to the following formulation. As a result, a resin-coated magenta pigment dispersion B having a magenta pigment concentration of 15% by mass was obtained.

<Formulation of Resin-Coated Magenta Pigment Dispersion B>

| | |
|---|---|
| C. I. Pigment Red 122 pigment powder (trade name: CROMOPHTAL JET MAGENTA DMQ, manufactured by BASF Japan Ltd. (former Ciba)) | 10.0 parts |
| Water-insoluble polymer 1 described above (water-insoluble resin) | 3.0 parts |
| Methyl ethyl ketone (organic solvent) | 30.5 parts |
| 1 mol/L NaOH aqueous solution (neutralizing agent) | 4.2 parts |
| Ion exchanged water | 102.3 parts |

(Preparation of Resin-Coated Carbon Black Dispersion C)

The components in the formulation described below were mixed, and the resulting mixture was subjected to dispersion for a period of from 3 hours to 6 hours using a bead mill with zirconia beads having a diameter of 0.1 mm. Subsequently, from the resulting dispersion, the methyl ethyl ketone was removed under reduced pressure at 55° C., and further a portion of water was removed, to prepare a resin-coated carbon black dispersion C having a carbon black concentration of 15.0% by mass.

<Formulation of Resin-Coated Carbon Black Dispersion C>

| | |
|---|---|
| Carbon black (trade name: NIPEX 180-IQ, manufactured by Evonik-Degussa GmbH) | 10.0 parts |
| Water-insoluble polymer 1 described above (water-insoluble resin) | 4.5 parts |
| Methyl ethyl ketone (organic solvent) | 30.5 parts |
| 1 mol/L NaOH aqueous solution (neutralizing agent) | 6.3 parts |
| Ion exchanged water | 98.7 parts |

—Preparation of Self-Dispersing Polymer—

540.0 g of methyl ethyl ketone were placed in a 2 L three-necked flask equipped with a mechanical stirrer, a thermometer, a reflux condenser tube, and a nitrogen gas inlet tube, and were heated to a temperature of 75° C. While maintaining the temperature inside the reaction vessel at 75° C., to this reaction vessel, a mixed solution of 108 g of methyl methacrylate, 388.8 g of isobornyl methacrylate, 43.2 g of methacrylic acid, 108 g of methyl ethyl ketone, and 2.1 g of "V-601" (trade name, manufactured by Wako Pure Chemical Industries, Ltd.) was added dropwise at a constant speed such that the addition was completed in two hours. After completion of the addition, a solution of 1.15 g of "V-601" and 15.0 g of methyl ethyl ketone was added thereto, followed by stirring at 75° C. for two hours. Subsequently, a solution of 0.54 g of "V-601" and 15.0 g of methyl ethyl ketone was further added thereto, followed by stirring at 75° C. for two hours. Thereafter, the reaction liquid was heated to 85° C. and stirring was further continued for two hours. Thereby, a resin solution containing a methyl methacrylate/isobornyl methacrylate/methacrylic acid (=20/72/8 [mass ratio]) copolymer was obtained.

The obtained copolymer had a weight average molecular weight (Mw) of 60,000 and an acid value of 54.2 (mgKOH/g). Here, the weight average molecular weight was measured by gel permeation chromatography (GPC) and is expressed in terms of polystyrene. For the GPC, HLC-8020 GPC (trade name, manufactured by Tosoh Corporation) was used, and TSK GEL SUPER HZM-H, TSK GEL SUPER HZ4000, and TSK GEL SUPER HZ200 (all trade names, manufactured by Tosoh Corporation) were used as columns, and THF (tetrahydrofuran) was used as an eluent. The acid value was determined in accordance with the method described in JIS Standards (JIS K0070: 1992).

Subsequently, 588.2 g of the resin solution were weighed out, to which, then 165 g of isopropanol and 120.8 mL of a 1 mol/L aqueous solution of sodium hydroxide were added, and then the temperature inside the reaction vessel was elevated to 80° C. Next, 718 g of distilled water were added thereto dropwise at a rate of 20 mL/min to form a water dispersion. Thereafter, under atmospheric pressure, the temperature inside the reaction vessel was kept at 80° C. for 2 hours, then at 85° C. for 2 hours, and then at 90° C. for 2 hours, to distill off the solvent. Then, the pressure inside the reaction vessel was reduced to further distill off the isopropanol, methyl ethyl ketone, and distilled water, thereby obtaining an aqueous dispersion of a self-dispersing polymer (resin particles) having a solids content of 25.0% by mass.

—Preparation of Ink—

Using the resin-coated pigment dispersion and the self-dispersing polymer obtained as described above, inks each having the formulation shown in Table 1 below were prepared, and the inks were subjected to filtration using a 0.2 μm membrane filter, thereby producing inks A to Z-1. Note that, in Table 1, the contents of respective components are expressed by the amount [% by mass] with respect to the total amount of the ink (on the basis of mass), and the component with the "*" sign was added so as to give the value shown in Table 1 below in terms of solids content.

The obtained inks were each prepared so as to have a pH of 8.5. Here, the pH was adjusted by using a 47% by mass sulfuric acid or a 50% by mass sodium hydroxide. The pH of an undiluted solution of the obtained ink was measured using PH METER WM-50EG (trade name, manufactured by DKK-TOA CORPORATION) at a temperature of 25° C.±1° C.

TABLE 1

| Ink Composition | | Ink No. A | Ink No. B | Ink No. C | Ink No. D |
|---|---|---|---|---|---|
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |
| | Resin-Coated Magenta Pigment Dispersion B (dispersed using water-insoluble polymer) | 0.8* | | 0.8* | 0.8* |
| | CAB-O-JET 260 (self-dispersible magenta pigment) | | 0.8* | | |
| | Resin-Coated Carbon Black Dispersion C (dispersed using water-insoluble polymer) | 1.5* | 1.5* | | 1.5* |
| | CAB-O-JET 300 (self-dispersible carbon black) | | | 1.5* | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, PVA, or PEG | PVP K12 (PVP, Mw = 3,500) | | | | |
| | PVP K15 (PVP, Mw = 8,000 to 10,000) | 0.05 | 0.1 | 0.2 | 0.5 |
| | PVP K30 (PVP, Mw = 40,000) | | | | |
| | PVP K40 (PVP, Mw = 400,000) | | | | |
| | PEG 20000 (PEG, Mw = 20,000) | | | | |
| | PVA-205 (PVA, Mw = 20,000) | | | | |
| PE-108 (PEO/PPO block copolymer) | | | | | |
| PE-68 (PEO/PPO block copolymer) | | | | | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | 8* | 8* | 8* | 8* |
| Carnauba Wax | | 2 | 2 | 2 | 2 |
| Paraffin Wax | | | | | |
| PROXEL XL2 | | 0.3 | 0.3 | 0.3 | 0.3 |
| Ion Exchanged Water | | Residual amount | Residual amount | Residual amount | Residual amount |
| Remarks | | Invention | Invention | Invention | Invention |

TABLE 1-continued

| Ink Composition | | Ink No. E | F | G | H |
|---|---|---|---|---|---|
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |
| | Resin-Coated Magenta Pigment Dispersion B (dispersed using water-insoluble polymer) | 0.8* | 0.8* | 0.8* | 0.8* |
| | CAB-O-JET 260 (self-dispersible magenta pigment) | | | | |
| | Resin-Coated Carbon Black Dispersion C (dispersed using water-insoluble polymer) | 1.5* | 1.5* | 1.5* | 1.5* |
| | CAB-O-JET 300 (self-dispersible carbon black) | | | | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, PVA, or PEG | PVP K12 (PVP, Mw = 3,500) | 0.05 | | | |
| | PVP K15 (PVP, Mw = 8,000 to 10,000) | | | | |
| | PVP K30 (PVP, Mw = 40,000) | | 0.05 | | |
| | PVP K40 (PVP, Mw = 400,000) | | | 0.05 | |
| | PEG 20000 (PEG, Mw = 20,000) | | | | 0.05 |
| | PVA-205 (PVA, Mw = 20,000) | | | | |
| PE-108 (PEO/PPO block copolymer) | | | | | |
| PE-68 (PEO/PPO block copolymer) | | | | | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | 8* | 8* | 8* | 8* |
| Carnauba Wax | | 2 | 2 | 2 | 2 |
| Paraffin Wax | | | | | |
| PROXEL XL2 | | 0.3 | 0.3 | 0.3 | 0.3 |
| Ion Exchanged Water | | Residual amount | Residual amount | Residual amount | Residual amount |
| Remarks | | Invention | Invention | Invention | Invention |

| Ink Composition | | Ink No. I | J | K | L |
|---|---|---|---|---|---|
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |
| | Resin-Coated Magenta Pigment Dispersion B (dispersed using water-insoluble polymer) | 0.8* | 0.8* | 0.8* | 0.8* |
| | CAB-O-JET 260 (self-dispersible magenta pigment) | | | | |
| | Resin-Coated Carbon Black Dispersion C (dispersed using water-insoluble polymer) | 1.5* | 1.5* | 1.5* | 1.5* |
| | CAB-O-JET 300 (self-dispersible carbon black) | | | | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, PVA, or | PVP K12 (PVP, Mw = 3,500) | | | | |
| | PVP K15 (PVP, Mw = 8,000 to 10,000) | | | 0.05 | 0.05 |

TABLE 1-continued

| | | | | | |
|---|---|---|---|---|---|
| PEG | PVP K30 (PVP, Mw = 40,000) | | | | |
| | PVP K40 (PVP, Mw = 400,000) | | | | |
| | PEG 20000 (PEG, Mw = 20,000) | 0.5 | | | |
| | PVA-205 (PVA, Mw = 20,000) | | 0.05 | | |
| PE-108 (PEO/PPO block copolymer) | | | | 0.05 | 0.5 |
| PE-68 (PEO/PPO block copolymer) | | | | | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | 8* | 8* | 8* | 8* |
| Carnauba Wax | | 2 | 2 | 2 | 2 |
| Paraffin Wax | | | | | |
| PROXEL XL2 | | 0.3 | 0.3 | 0.3 | 0.3 |
| Ion Exchanged Water | | Residual amount | Residual amount | Residual amount | Residual amount |
| Remarks | | Invention | Invention | Invention | Invention |

| | | Ink No. | | | |
|---|---|---|---|---|---|
| | Ink Composition | M | N | O | P |
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |
| | Resin-Coated Magenta Pigment Dispersion B (dispersed using water-insoluble polymer) | 0.8* | 0.8* | 0.8* | 0.8* |
| | CAB-O-JET 260 (self-dispersible magenta pigment) | | | | |
| | Resin-Coated Carbon Black Dispersion C (dispersed using water-insoluble polymer) | 1.5* | 1.5* | 1.5* | 1.5* |
| | CAB-O-JET 300 (self-dispersible carbon black) | | | | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, PVA, or PEG | PVP K12 (PVP, Mw = 3,500) | | | | |
| | PVP K15 (PVP, Mw = 8,000 to 10,000) | 0.05 | 0.05 | 0.05 | 0.05 |
| | PVP K30 (PVP, Mw = 40,000) | | | | |
| | PVP K40 (PVP, Mw = 400,000) | | | | |
| | PEG 20000 (PEG, Mw = 20,000) | | | | |
| | PVA-205 (PVA, Mw = 20,000) | | | | |
| PE-108 (PEO/PPO block copolymer) | | 0.75 | 1 | | |
| PE-68 (PEO/PPO block copolymer) | | | | 0.05 | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | 8* | 8* | 8* | 8* |
| Carnauba Wax | | 2 | 2 | 2 | |
| Paraffin Wax | | | | | 2 |
| PROXEL XL2 | | 0.3 | 0.3 | 0.3 | 0.3 |
| Ion Exchanged Water | | Residual amount | Residual amount | Residual amount | Residual amount |
| Remarks | | Invention | Invention | Invention | Invention |

| | | Ink No. | | | |
|---|---|---|---|---|---|
| | Ink Composition | Q | R | S | T |
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |

TABLE 1-continued

| | | | | | |
|---|---|---|---|---|---|
| | Resin-Coated Magenta Pigment Dispersion B (dispersed using water-insoluble polymer) | 0.8* | 0.8* | 0.8* | 0.8* |
| | CAB-O-JET 260 (self-dispersible magenta pigment) | | | | |
| | Resin-Coated Carbon Black Dispersion C (dispersed using water-insoluble polymer) | 1.5* | 1.5* | 1.5* | 1.5* |
| | CAB-O-JET 300 (self-dispersible carbon black) | | | | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, | PVP K12 (PVP, Mw = 3,500) | | | | |
| PVA, | PVP K15 (PVP, Mw = 8,000 to 10,000) | | | 1 | |
| or | PVP K30 (PVP, Mw = 40,000) | | | | |
| PEG | PVP K40 (PVP, Mw = 400,000) | | | | |
| | PEG 20000 (PEG, Mw = 20,000) | | | | |
| | PVA-205 (PVA, Mw = 20,000) | | | | 1 |
| PE-108 (PEO/PPO block copolymer) | | | | | |
| PE-68 (PEO/PPO block copolymer) | | | | | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | 8* | 8* | 8* | 8* |
| Carnauba Wax | | 2 | | 2 | 2 |
| Paraffin Wax | | | 2 | | |
| PROXEL XL2 | | 0.3 | 0.3 | 0.3 | 0.3 |
| Ion Exchanged Water | | Residual amount | Residual amount | Residual amount | Residual amount |
| Remarks | | Comparative | Comparative | Comparative | Comparative |

| | | Ink No. | | | |
|---|---|---|---|---|---|
| | Ink Composition | U | V | W | X |
| Pigment | Resin-Coated Cyan Pigment Dispersion A (dispersed using water-insoluble polymer) | 0.5* | 0.5* | 0.5* | 0.5* |
| | CAB-O-JET 250 (self-dispersible cyan pigment) | | | | |
| | Resin-Coated Magenta Pigment Dispersion B (dispersed using water-insoluble polymer) | 0.8* | 0.8* | 0.8* | 0.8* |
| | CAB-O-JET 260 (self-dispersible magenta pigment) | | | | |
| | Resin-Coated Carbon Black Dispersion C (dispersed using water-insoluble polymer) | 1.5* | 1.5* | 1.5* | 1.5* |
| | CAB-O-JET 300 (self-dispersible carbon black) | | | | |
| SANNIX GP250 (manufactured by Sanyo Chemical Industries, Ltd.) | | 10 | 10 | 10 | 10 |
| Triethylene Glycol Monomethyl Ether | | 5 | 5 | 5 | 5 |
| Dipropylene Glycol | | 3 | 3 | 3 | 3 |
| PVP, | PVP K12 (PVP, Mw = 3,500) | | | | |
| PVA, | PVP K15 (PVP, Mw = 8,000 to 10,000) | 0.05 | | 0.05 | |
| or | PVP K30 (PVP, Mw = 40,000) | | | | |
| PEG | PVP K40 (PVP, Mw = 400,000) | | | | |
| | PEG 20000 (PEG, Mw = 20,000) | | | | |
| | PVA-205 (PVA, Mw = 20,000) | | | | |
| PE-108 (PEO/PPO block copolymer) | | | | | |
| PE-68 (PEO/PPO block copolymer) | | | | | |
| Urea | | 5 | 5 | 5 | 5 |
| OLFINE E1010 | | 1 | 1 | 1 | 1 |
| Aqueous Dispersion of Self-Dispersing Polymer (water-insoluble polymer) | | | | 8* | 8* |

TABLE 1-continued

| | | |
|---|---|---|
| Carnauba Wax | 2 | 2 |
| Paraffin Wax | | |
| PROXEL XL2 | 0.3 | 0.3 | 0.3 | 0.3 |
| Ion Exchanged Water | Residual amount | Residual amount | Residual amount | Residual amount |
| Remarks | Invention | Comparative | Invention | Comparative |

| | | Ink No. | | |
|---|---|---|---|---|
| Ink Composition | | Y | Z | Z-1 |
| Pigment | Resin-Coated Cyan Pigment Dispersion A (dispersed using water-insoluble polymer) | | 0.3* | 0.5* |
| | CAB-O-JET 250 (self-dispersible cyan pigment) | 0.5* | | |
| | Resin-Coated Magenta Pigment Dispersion B (dispersed using water-insoluble polymer) | | | 0.8* |
| | CAB-O-JET 260 (self-dispersible magenta pigment) | 0.8* | | |
| | Resin-Coated Carbon Black Dispersion C (dispersed using water-insoluble polymer) | | 2.7* | 1.5* |
| | CAB-O-JET 300 (self-dispersible carbon black) | 1.5* | | |
| SANNIX GP250 (manufactured by Sanyo Chemical Industries, Ltd.) | | 10 | 10 | 10 |
| Triethylene Glycol Monomethyl Ether | | 5 | 5 | 5 |
| Dipropylene Glycol | | 3 | 3 | 3 |
| PVP, PVA, or PEG | PVP K12 (PVP, Mw = 3,500) | | | |
| | PVP K15 (PVP, Mw = 8,000 to 10,000) | 0.05 | 0.05 | 0.8 |
| | PVP K30 (PVP, Mw = 40,000) | | | |
| | PVP K40 (PVP, Mw = 400,000) | | | |
| | PEG 20000 (PEG, Mw = 20,000) | | | |
| | PVA-205 (PVA, Mw = 20,000) | | | |
| PE-108 (PEO/PPO block copolymer) | | 0.05 | | |
| PE-68 (PEO/PPO block copolymer) | | | | |
| Urea | | 5 | 5 | 5 |
| OLFINE E1010 | | 1 | 1 | 1 |
| Aqueous Dispersion of Self-Dispersing Polymer (water-insoluble polymer) | | 8* | 8* | 8* |
| Carnauba Wax | | 2 | 2 | 2 |
| Paraffin Wax | | | | |
| PROXEL XL2 | | 0.3 | 0.3 | 0.3 |
| Ion Exchanged Water | | Residual amount | Residual amount | Residual amount |
| Remarks | | Invention | Invention | Invention |

Note)
unit of numeric values: % by mass
Details of the components in Table 1 above are as follows.
CAB-O-JET 250: trade name, manufactured by Cabot Corporation; self-dispersible cyan pigment
CAB-O-JET 260: trade name, manufactured by Cabot Corporation; self-dispersible magenta pigment
CAB-O-JET 300: trade name, manufactured by Cabot Corporation; self-dispersible carbon black
PVP K12, PVP K15, PVP K30, and PVP K40: all trade names, manufactured by Wako Pure Chemical Industries, Ltd.; polyvinyl pyrrolidone
PEG 20000: trade name, manufactured by Wako Pure Chemical Industries, Ltd.; polyethylene glycol
PVA-205: trade name, manufactured by Kuraray Co., Ltd.; polyvinyl alcohol
OLFINE E1010: trade name, manufactured by Nissin Chemical Industry Co., Ltd.; nonionic surfactant
PE-108: NEWPOL PE-108 (trade name), manufactured by Sanyo Chemical Industries, Ltd. (PEO/PPO block copolymer containing 80% by mass of PEO block, weight average molecular weight of 16,000)
PE-68: NEWPOL PE-68 (trade name), manufactured by Sanyo Chemical Industries, Ltd. (PEO/PPO block copolymer containing 80% by mass of PEO block, weight average molecular weight of 9,000)
Carnauba wax: SELOSOL 524 (trade name), manufactured by CHUKYO YUSHI CO, LTD.
Paraffin wax: SELOSOL 428 (trade name), manufactured by CHUKYO YUSHI CO, LTD.
PROXEL XL2: trade name, manufactured by AVECIA Inc.; 1,2-benzisothiazolin-3-one <Preparation of Treatment Liquid>

The following components were mixed, thereby preparing a treatment liquid. The pH (25° C.±1° C.) of the treatment liquid was measured by the same method as the method for the ink, and was revealed to be 1.03.

<Formulation>

| | |
|---|---|
| Orthophosphoric acid (85% aqueous solution) | 5.0% by mass |
| Malonic acid (the second aggregating agent) | 12.0% by mass |

-continued

| | |
|---|---|
| Diethylene glycol | 4% by mass |
| Triethylene glycol monomethyl ether | 4% by mass |
| Ion exchanged water | Residual amount |

<Preparation of Maintenance Liquid>

The following components were mixed, thereby preparing a maintenance liquid. In this process, BHT (2,6-di-t-butyl-4-methylphenol) was dissolved in DEGmBE (diethylene glycol monobutyl ether; water-soluble organic solvent) in advance, and to this, water and NaHCO₃ were added, to prepare the maintenance liquid. The pH (25° C.±1° C.) of the maintenance liquid was measured by the same method as the method for the ink, and the pH immediately after the preparation of the liquid was revealed to be 8.6.

<Formulation>

| | |
|---|---|
| DEGmBE | 25% by mass |
| BHT (2,6-di-t-butyl-4-methylphenol) | 0.01% by mass |
| NaHCO₃ | 0.04% by mass |
| Ion exchanged water | Residual amount |

<Inkjet Recording Apparatus>

As the inkjet recording apparatus, an apparatus having the same configuration as that of the inkjet recording apparatus described in FIG. 1 of JP-A No. 2010-155928 was prepared, and the conditions thereof were set as described below (the symbol shows the number described in FIG. 1). For the recording head, a fluid executer as described in FIG. 3 of Japanese National Phase Publication No. 2008-544852 was used. This fluid executer has a non-wetting layer containing a fluorocarbon chain on the surface of the nozzle face (the surface of the outside of holes) having ejection holes, and has an $SiO_2$ layer on the surface of the inside of holes.

<Conditions>

Temperature of ink inside the sub-tank 102: 35° C.
Mesh size of filter 122: 5 μm
Head unit: nozzle diameter 18 μm, 1200 dpi, the length of one unit of 2 cm
Piezoelectric element 68: lead zirconate titanate (piezo)
Amount of ink that flows in the common channel 52: from 2 mL/sec to 4 mL/sec <Image Formation>

A sheet of a recording medium (N SILVER DIA (trade name, manufactured by Nippon Paper Industries Co., Ltd.; basis weight: 104.7 g/m², coated paper (matte)) was fixed on a stage that was movable at 500 mm/sec in a predetermined linear direction. Then, the treatment liquid obtained as described above was coated thereon using a wire bar coater to give a coating amount of about 5 g/m², and immediately after coating, dried at 50° C. for 2 seconds. After that, a solid image was printed as follows: the inkjet recording apparatus described above was arranged and fixed, and while the recording medium was moved in the sub-scanning direction at a constant speed, each of the inks A to Z-1 obtained as described above was ejected in a line system under the ejection conditions of an ink droplet amount of 2.4 pL and a resolution of 1200 dpi×1200 dpi. Immediately after printing the image, the image was dried at 50° C. for 3 seconds. Subsequently, the resulting printed recording medium was passed between a pair of fixing rollers heated at 50° C. so as to conduct a fixation treatment at a nip pressure of 0.20 MPa and a nip width of 4 mm. In this manner, a sample for evaluation was obtained.

Here, the fixing rollers were configured by a heating roller composed of a cylindrical metal core which is made of SUS (stainless steel), and which has a halogen lamp therein, and a silicone resin that coats the surface of the cylindrical metal core, and a counter roller that is in pressure contact with the heating roller.

<Evaluation>

The following evaluation was performed using the inks A to Z-1 and the images formed by using the inks A to Z-1, respectively. The evaluation results are shown in Table 2 below.

—Storage Stability (Color Separation)—

The inks A to Z-1 were each placed in a storage container (FUJITAINER®, manufactured by FUJIMORI KOGYO CO., LTD.) and stored under an environment of 60° C. for one month. Hereinbelow, this operation may be referred to as "thermo-aging", and the inks that have been subjected to this operation may be referred to as "thermo-aged inks (A to Z-1)".

After the thermo-aging, the storage containers were taken out, and the state of the surface of the storage container wall was visually observed. Evaluation was performed in accordance with the following evaluation criteria.

<Evaluation Criteria>

3: Adhesion of a substance having the same color (black) as the color of the ink is observed.
2: Adhesion of ink having a cyanish and magentaish color is observed at the vicinity of the cap.
1: Adhesion of ink having a cyanish and magentaish color is observed at the entire wall face.

—Ink Adhesive Property—

The following evaluation was performed using the inks A to Z-1 and a test piece (having an $SiO_2$ layer on its surface) having the same layer structure as that of the inside surface of the fluid executer of the recording head which was used in the above inkjet recording apparatus.

5 μL of each of the inks were added dropwise onto the $SiO_2$ layer of the above test piece, and the test piece was allowed to stand still for 5 minutes under an environment of 23° C. and 50% RH. Thereafter, washing was conducted using ion exchanged water. Then, the existence or absence of an adhered substance remained on the test piece was visually observed. Evaluation was performed in accordance with the following evaluation criteria.

<Evaluation Criteria>

4: No adhered substance is observed on the test piece.
3: A part of a trace is observed at the portion where the ink has been added dropwise.
2: A border-like adhered substance is observed at the portion where the ink has been added dropwise.
1: An adhered substance is observed at the portion where the ink has been added dropwise.

—Continuous Ejection Property—

Using each of the inks A to Z-1 and using the above inkjet recording apparatus, an image was printed on "GASAI SHASHIN SHIAGE PRO" (trade name, manufactured by Fujifilm Corporation) without applying a treatment liquid, followed by drying. A fixation treatment including passing through fixing rollers was not conducted. In this manner, a line image with a resolution of 75 dpi×24000 dpi was printed on one sheet (which is designated as "printed sample 1"). Thereafter, an action of ejection corresponding to printing of 2,000 sheets was conducted, and then again, a line image was printed on another sheet of the same recording medium that had been used above (which is designated as "printed sample 2"). Further, an action of ejection corresponding to printing of 2,000 sheets was conducted, and then again, a line image was printed on yet another sheet of the same recording medium that had been used above (which is designated as "printed sample 3").

With regard to the printed samples 1 to 3 obtained as described above, the center value of the line was measured using DOT ANALYZER DA-6000 (trade name, manufactured by Oji Scientific Instruments), and the standard deviation σ of the distances from the center line was calculated.

Evaluation was performed in accordance with the following evaluation criteria. The evaluation results are shown in Table 2 below.

<Evaluation Criteria>
5: σ<1 μm
4: 1 μm≤σ<2 μm
3: 2 μm≤σ<4 μm
2: 4 μm≤σ<6 μm
1: σ≥6 μm —Recoverability after Leaving—

Using each of the inks A to Z-1 and using the above inkjet recording apparatus, an image was printed on "GASAI SHASHIN SHIAGE PRO" (trade name, manufactured by Fujifilm Corporation) without applying a treatment liquid, followed by drying. A fixation treatment including passing through fixing rollers was not conducted. In this manner, a nozzle check pattern image and a line image with a resolution of 75 dpi×24000 dpi were printed, respectively on one sheet (hereinbelow, the obtained images are designated as "initial image samples"). Thereafter, the environment of the recording head nozzle unit was kept at an environment of 25° C. and 50% RH, and the recording head was left for 24 hours. Then after leaving, a nozzle check pattern image and a line image were printed again, respectively on another sheet of the same recording medium that had been used above (hereinbelow, the obtained images are designated as "image samples after leaving").

With regard to the image samples after leaving which were obtained as described above, nozzle failure (image voids) in the nozzle check pattern image was observed using an optical microscope, and the ejection rate was determined. The existence or absence of non-ejection was evaluated in accordance with the criteria described below.

Note that, the ejection rate was determined according to the following equation:

Ejection rate (%)=(Total Number of Ejecting Nozzles in Image Sample After Leaving)/(Total Number of Ejecting Nozzles in Initial Image Sample)×100

Further, with regard to each of the line images of the initial image samples and the image samples after leaving, the center value of the line was measured using DOT ANALYZER DA-6000 (trade name, manufactured by Oji Scientific Instruments), and the standard deviation σ of the distances from the center line was calculated. Evaluation of ejection deviation was performed in accordance with the evaluation criteria described below.

—Evaluation Criteria for Evaluation on Image Voids (Non-Ejection)—
5: The ejection rate is 100%.
4: The ejection rate is 99% or higher but lower than 100%.
3: The ejection rate is 98% or higher but lower than 99%.
2: The ejection rate is 95% or higher but lower than 98%.
1: The ejection rate is lower than 95%.

—Evaluation Criteria for Evaluation on Ejection Deviation—
5: σ<2 μm
4: 2 μm≤σ<4 μm
3: 4 μm≤σ<6 μm
2: 6 μm≤σ<8 μm
1: σ≥8 μm —Recoverability after Repeatedly Performing Maintenance—

Using each of the inks A to Z-1 and using the above inkjet recording apparatus, an image was printed on "GASAI SHASHIN SHIAGE PRO" (trade name, manufactured by Fujifilm Corporation) without applying a treatment liquid, followed by drying. A fixation treatment including passing through fixing rollers was not conducted. In this manner, a nozzle check pattern image and a line image with a resolution of 75 dpi×24000 dpi were printed respectively on one sheet (hereinbelow, the obtained images are designated as "initial images 1"). Thereafter, an action of ejection corresponding to printing of 100 sheets was conducted.

Then, using a roller, the maintenance liquid was applied on the nozzle face of the inkjet head, and the nozzle face of the inkjet head was wiped with a wiping cloth (TORAYSEE®, manufactured by Toray Industries, Inc.). An apparatus that automatically conducts this action was provided and this maintenance action was repeatedly performed for 50,000 times. During this operation, an action of ejection corresponding to printing of 2,000 sheets was conducted for every 1,000 times of the maintenance action.

Then again, a nozzle check pattern image and a line image were printed, respectively on another sheet of the above recording medium (hereinbelow, the obtained images are designated as "image samples after repeatedly performing maintenance").

With regard to the image samples after repeatedly performing maintenance which were obtained as described above, voids of nozzles (image voids) in the nozzle check pattern image was observed using a light microscope, and the ejection rate was determined. The existence or absence of non-ejection was evaluated.

Further, with regard to each of the line images of the initial images 1 and the image samples after repeatedly performing maintenance, the center value of the line was measured using DOT ANALYZER DA-6000 (trade name, manufactured by Oji Scientific Instruments), and the standard deviation σ of the distances from the center line was calculated.

The evaluation criteria for evaluation on image voids (non-ejection) and the evaluation criteria for evaluation on ejection deviation in the recoverability after repeatedly performing maintenance are the same as the evaluation criteria for the evaluation on non-ejection and the evaluation criteria for the evaluation on ejection deviation in the recoverability after leaving, respectively.

—Recoverability after Thermo-Aging (Thermo-Aged Ink)—

Using the thermo-aged inks A to Z-1 obtained in the evaluation on storage stability (existence or absence of color separation), the ink adhesive property, continuous ejection property, image voids (non-ejection), and ejection deviation of the ink were evaluated.

The evaluation methods and the evaluation criteria were as described above.

TABLE 2

| Ink No. | Storage Stability (Color Separation) | Ink Adhesive Property | Continuous Ejection Property | After Leaving | | After Repeatedly Performing Maintenance | | After Thermo-Aging (Thermo-Aged Ink) | | | | Remarks |
| | | | | Image Voids | Ejection Deviation | Image Voids | Ejection Deviation | Ink Adhesive Property | Continuous Ejection Property | Image Voids | Ejection Deviation | |
| --- | --- | --- | --- | --- | --- | --- | --- | --- | --- | --- | --- | --- |
| A | 3 | 4 | 5 | 5 | 5 | 5 | 5 | 4 | 5 | 5 | 4 | Invention |
| B | 3 | 4 | 5 | 5 | 5 | 5 | 5 | 4 | 5 | 5 | 4 | Invention |

TABLE 2-continued

| Ink No. | Storage Stability (Color Separation) | Ink Adhesive Property | Continuous Ejection Property | After Leaving | | After Repeatedly Performing Maintenance | | After Thermo-Aging (Thermo-Aged Ink) | | | | Remarks |
|---|---|---|---|---|---|---|---|---|---|---|---|---|
| | | | | Image Voids | Ejection Deviation | Image Voids | Ejection Deviation | Ink Adhesive Property | Continuous Ejection Property | Image Voids | Ejection Deviation | |
| C | 3 | 4 | 5 | 5 | 5 | 5 | 5 | 4 | 4 | 4 | 4 | Invention |
| D | 3 | 4 | 5 | 5 | 5 | 5 | 5 | 4 | 4 | 4 | 4 | Invention |
| E | 3 | 3 | 5 | 5 | 5 | 5 | 5 | 3 | 4 | 4 | 4 | Invention |
| F | 3 | 3 | 5 | 4 | 5 | 4 | 4 | 3 | 4 | 4 | 4 | Invention |
| G | 3 | 3 | 4 | 3 | 3 | 3 | 3 | 3 | 4 | 4 | 4 | Invention |
| H | 2 | 3 | 4 | 4 | 4 | 4 | 4 | 3 | 4 | 4 | 3 | Invention |
| I | 2 | 3 | 4 | 4 | 3 | 4 | 3 | 3 | 4 | 4 | 3 | Invention |
| J | 2 | 3 | 4 | 4 | 3 | 3 | 3 | 3 | 4 | 4 | 3 | Invention |
| K | 3 | 4 | 5 | 5 | 5 | 5 | 5 | 4 | 5 | 5 | 5 | Invention |
| L | 3 | 4 | 5 | 5 | 5 | 5 | 5 | 4 | 5 | 5 | 5 | Invention |
| M | 3 | 4 | 5 | 4 | 5 | 4 | 4 | 4 | 5 | 5 | 4 | Invention |
| N | 3 | 4 | 4 | 4 | 4 | 4 | 4 | 4 | 4 | 4 | 4 | Invention |
| O | 3 | 4 | 5 | 5 | 5 | 5 | 5 | 4 | 5 | 5 | 5 | Invention |
| P | 3 | 4 | 5 | 5 | 5 | 5 | 5 | 4 | 4 | 5 | 4 | Invention |
| Q | 1 | 1 | 1 | 1 | 1 | 1 | 1 | 1 | 1 | 1 | 1 | Comparative |
| R | 1 | 1 | 1 | 1 | 1 | 1 | 1 | 1 | 1 | 1 | 1 | Comparative |
| S | 3 | 2 | 3 | 2 | 3 | 3 | 2 | 1 | 3 | 3 | 2 | Comparative |
| T | 3 | 2 | 2 | 2 | 2 | 2 | 2 | 1 | 2 | 2 | 2 | Comparative |
| U | 3 | 4 | 5 | 5 | 5 | 5 | 5 | 4 | 5 | 5 | 5 | Invention |
| V | 1 | 1 | 1 | 1 | 1 | 1 | 1 | 1 | 1 | 1 | 1 | Comparative |
| W | 3 | 4 | 5 | 5 | 5 | 5 | 5 | 4 | 5 | 5 | 5 | Invention |
| X | 1 | 4 | 4 | 3 | 3 | 3 | 2 | 4 | 1 | 1 | 1 | Comparative |
| Y | 3 | 4 | 5 | 5 | 5 | 5 | 5 | 4 | 5 | 5 | 5 | Invention |
| Z | 3 | 4 | 5 | 5 | 5 | 5 | 5 | 4 | 5 | 5 | 5 | Invention |
| Z-1 | 3 | 4 | 4 | 4 | 4 | 4 | 3 | 4 | 3 | 3 | 3 | Invention |

As is evident from Table 2 above, the ink compositions of the present invention exhibited excellent ink storage stability (in which, color separation was suppressed), and by using the ink compositions of the present invention, adhesion of ink was suppressed, and the ink composition of the present invention exhibited excellent continuous ejection property.

Further, by using the ink compositions of the present invention, non-ejection and ejection deviation were suppressed after leaving, after repeatedly performing maintenance, and also after thermo-aging.

Furthermore, by using the ink compositions of the present invention, adhesion of ink was suppressed even after thermo-aging, and the ink compositions of the present invention exhibited excellent continuous ejection property even after thermo-aging.

Accordingly, it was understood that, with the ink compositions of the present invention, an excellent ejection stability can be expected, even when image formation is performed by ejection of ink in a usage form in which rejection of ink and temporary suspension of ejection are repeated over a long period of time.

Exemplary embodiments of the invention include, but are not limited to, the following.

<1> An ink composition comprising:
  carbon black;
  at least one selected from the group consisting of a cyan pigment and a magenta pigment;
  at least one selected from the group consisting of polyvinyl pyrrolidone, polyvinyl alcohol, and polyethylene glycol, at a ratio of 0.01% by mass or higher but lower than 1.00% by mass, relative to the total amount of the composition;
  water-insoluble or substantially water-insoluble resin particles, water-insoluble or substantially water-insoluble wax particles, or any mixture thereof; and
  water.

<2> The ink composition of <1>, wherein each of at least one selected from the group consisting of the carbon black, the cyan pigment and the magenta pigment is independently a self dispersible pigment or a pigment in which at least a part of a surface thereof is coated with a water-insoluble resin.

<3> The ink composition of <1> or <2>, further comprising a polyoxyethylene-polyoxypropylene copolymer.

<4> The ink composition of any one of <1> to <3>, wherein at least a part of a surface of at least one selected from the group consisting of the carbon black, the cyan pigment and the magenta pigment is coated with a water-insoluble resin by a phase inversion emulsification method.

<5> The ink composition of any one of <1> to <4>, wherein the resin particles are self-dispersing resin particles.

<6> The ink composition of any one of <1> to <5>, wherein the resin particles includes a resin synthesized in an organic solvent, and the resin particles are in the form of a dispersion in which a part of or all anionic groups in the resin are neutralized and which includes water as a continuous phase.

<7> The ink composition of any one of <1> to <6>, wherein the wax particles are particles of at least one selected from the group consisting of paraffin wax, derivatives of paraffin wax, carnauba wax and mixtures thereof.

<8> The ink composition of any one of <1> to <7>, wherein the ink composition has a pH at a temperature of 25° C. of from 7.5 to 10.0.

<9> The ink composition of any one of <1> to <8>, further comprising at least one selected from the group consisting of urea and urea derivatives.

<10> An ink set comprising:
  the ink composition of any one of <1> to <9>; and
  a treatment liquid including an aggregating component that forms an aggregate when contacted with the ink composition.

<11> An image forming method comprising:
ejecting the ink composition of any one of <1> to <9> or the ink composition included in the ink set of <10> onto a recording medium by an inkjet method from an ejection head which is provided with a plurality of nozzle holes that eject liquid droplets, each of the nozzle holes comprising an internal surface that comprises a film containing a silicon atom.

<12> The image forming method of <11>, wherein the ink composition is ejected by a piezoelectric inkjet method.

<13> The image forming method of <11> or <12>, further comprising applying onto the recording medium a treatment liquid including an aggregating component that forms an aggregate when contacted with the ink composition.

<14> The image forming method of <13>, further comprising heating an image formed after the ejection of the ink composition and the application of the treatment liquid, to fix the image on the recording medium.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
    carbon black;
    at least one selected from the group consisting of a cyan pigment and a magenta pigment;
    at least one selected from the group consisting of polyvinyl pyrrolidone, polyvinyl alcohol, and polyethylene glycol, at a ratio of 0.01% by mass or higher but lower than 1.00% by mass, relative to the total amount of the composition;
    self-dispersing resin particles comprising a water-insoluble polymer that includes a constituent unit containing a cyclic aliphatic group; and
    water.

2. The ink composition of claim 1, wherein each of at least one selected from the group consisting of the carbon black, the cyan pigment and the magenta pigment is independently a self dispersible pigment or a pigment in which at least a part of a surface thereof is coated with a water-insoluble resin.

3. The ink composition of claim 1, further comprising a polyoxyethylene-polyoxypropylene copolymer.

4. The ink composition of claim 1, wherein at least a part of a surface of at least one selected from the group consisting of the carbon black, the cyan pigment and the magenta pigment is coated with a water-insoluble resin by a phase inversion emulsification method.

5. The ink composition of claim 1, wherein the self-dispersing resin particles includes a resin synthesized in an organic solvent, and the self-dispersing resin particles are in the form of a dispersion in which a part of or all anionic groups in the resin are neutralized and which includes water as a continuous phase.

6. The ink composition of claim 1, wherein the ink composition has a pH at a temperature of 25° C. of from 7.5 to 10.0.

7. The ink composition of claim 1, further comprising at least one selected from the group consisting of urea and urea derivatives.

8. An ink set comprising:
    the ink composition of claim 1; and
    a treatment liquid including an aggregating component that forms an aggregate when contacted with the ink composition.

9. An image forming method comprising:
    ejecting the ink composition claim 1 onto a recording medium by an inkjet method from an ejection head which is provided with a plurality of nozzle holes that eject liquid droplets, each of the nozzle holes comprising an internal surface that comprises a film containing a silicon atom.

10. The image forming method of claim 9, wherein the ink composition is ejected by a piezoelectric inkjet method.

11. The image forming method of claim 9, further comprising applying onto the recording medium a treatment liquid including an aggregating component that forms an aggregate when contacted with the ink composition.

12. The image forming method of claim 11, further comprising heating an image formed after the ejection of the ink composition and the application of the treatment liquid, to fix the image on the recording medium.

13. The ink composition of claim 1, further comprising a polyoxyethylene-polyoxypropylene copolymer in an amount of from 0.01% by mass to 0.5% by mass, with respect to the total mass of the ink composition.

14. The ink composition of claim 13, further comprising water-insoluble or substantially water-insoluble wax particles.

15. The ink composition of claim 14, wherein the wax particles include at least one selected from the group consisting of paraffin wax, derivatives of paraffin wax, and carnauba wax.

* * * * *